United States Patent [19]
Shroyer

[11] Patent Number: 6,160,988
[45] Date of Patent: *Dec. 12, 2000

[54] SYSTEM AND METHOD FOR MANAGING HARDWARE TO CONTROL TRANSMISSION AND RECEPTION OF VIDEO BROADCASTS

[75] Inventor: Stephen R. Shroyer, Ashburn, Va.

[73] Assignee: Electronic Data Systems Corporation, Plano, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/655,443

[22] Filed: May 30, 1996

[51] Int. Cl.[7] ............................. H04H 1/00; H04B 7/185; H04N 7/10
[52] U.S. Cl. ............................... 455/3.2; 455/12.1; 348/7
[58] Field of Search ................................. 455/12.1, 13.1, 455/427, 430, 3.2, 3.1, 5.1, 6.1; 348/6, 7, 12, 13; 380/211, 10, 239

[56] References Cited

U.S. PATENT DOCUMENTS

| | | | |
|---|---|---|---|
| 5,151,782 | 9/1992 | Ferraro | 348/7 |
| 5,270,809 | 12/1993 | Gammie et al. | 348/1 |
| 5,440,336 | 8/1995 | Buhro et al. | 348/13 |
| 5,521,631 | 5/1996 | Budow et al. | 348/7 |
| 5,600,364 | 2/1997 | Hendricks et al. | 348/1 |
| 5,603,077 | 2/1997 | Muckle et al. | 455/3.2 |
| 5,642,418 | 6/1997 | Farris et al. | 380/211 |
| 5,715,315 | 2/1998 | Handelman | 380/49 |
| 5,920,626 | 7/1999 | Durden et al. | 380/10 |
| 5,929,850 | 7/1999 | Broadwin et al. | 345/327 |
| 5,940,738 | 8/1999 | Rao | 455/4.2 |

OTHER PUBLICATIONS

"EDS Slide Presentation" presented at Technology Forum sponsored by Template Software, *EDS*, Oct., 1994, pp. 12–18.

*Primary Examiner*—Nguyen Vo
*Assistant Examiner*—Charles N. Appiah
*Attorney, Agent, or Firm*—L. Joy Griebenow; Baker & Botts L.L.P.

[57] ABSTRACT

A telecommunication management system is provided for managing hardware and software systems within a telecommunication network. The management system includes an Operator Services component, a Management Services component and an External Interfaces component. The Operator Services Component provides a user interface between one or more operators and the remainder of the system's processes. The Management Services Components provides servers which function as an interim stage of information transmittal between the operators and the external interfaces. The External Interfaces provide interfacing between network devices and the management system's operators by way of the Management Services component. The management system, for example, can efficiently manage a group of integrated receiver/decoders grouped together according to a satellite circuit.

20 Claims, 13 Drawing Sheets

SYSTEM AND METHOD FOR MANAGING HARDWARE TO CONTROL TRANSMISSION AND RECEPTION OF VIDEO BROADCASTS

BACKGROUND OF THE INVENTION

1. Field Of The Invention

This invention generally relates to telecommunications systems and, more particularly, to a system and method for managing hardware and software processes to control Transmission and reception of video broadcasts.

2. Background

Systems for the transmission and reception of the video broadcasts are generally known. Video broadcasts are typically transmitted from a broadcast site to a reception site by way of a satellite link or relay. The broadcast site typically broadcasts a particular program by sending an electronic signal to a particular satellite which services the reception site. The electronic signal can comprise both video and data information. The electronic signal may be received from the satellite by an integrated receiver/decoder ("IRD") located at the reception site.

The reception site typically services one or more subscribers which are linked to the reception site by a suitable transmission medium. The transmission medium can be, for example, coaxial cable, optical fiber or a combination of both. Once the signal has been received at the reception site from the satellite, it is forwarded to one or more of the subscribers.

Typically, both video and data information are transmitted from the broadcast site to the reception site. The data information may include decryption information used by the IRD to determine if the IRD is eligible to receive the video information being transmitted. The IRD compares the decryption information it receives with decryption keys previously stored in its memory. If a match occurs, the IRD will decrypt the video information and transmit a decoded signal to one or more designated subscribers.

A typical IRD contains 32 physical slots capable of storing decryption keys. This means an IRD can receive 1 of 32 possible broadcasts based upon the decryption keys it uses to decrypt the video transmission. Also, the IRD can be configured to receive a program command which instructs the IRD as to which slot to use to obtain the decryption keys needed to decrypt a particular video broadcast. By changing this program command to designate a different slot, the IRD can be tuned to a different frequency to receive a different video broadcast.

Telecommunication systems of the foregoing type suffer from several drawbacks. Such systems do not provide the ability to easily load decryption keys into IRD slots. Also, such systems do not allow an operator to quickly change the broadcast being received by an IRD by way of altering the program command. In the past, IRDs have been controlled by a personal computer ("PC")-based system. One such system used a Paradox database to store management information. The entire system ran on PCs in an MS Windows environment. However, four PCs were needed to run the entire system and each PC was dedicated to a distinct component of the system. Therefore, a system operator would have to move from one PC to another depending on the task he or she wished to perform. Also, the PCs were not networked together. If one PC crashed, then that part of the system was unavailable for use until the PC was replaced or repaired. Thus, the system was "single-threaded." Because the system was not integrated, a code switch was necessary to direct commands from one PC as opposed to another. For example, the program command could not be sent at the same time that other IRD commands were being transmitted. Thus, the code switch was necessary to control which PC could actually transmit a command over the satellite network at a given time. Another problem was that the Paradox database lacked referential integrity. For example, information relating to a particular IRD could be removed from the Paradox database without warning of an integrity violation. Further, only selected information was maintained in the Paradox database. The information structure was inflexible and IRDs could not be classified according to their current state (e.g., authorized, de-authorized, sold, etc.). Another drawback related to management reports, which had to be prepared manually. Also, audit trails of worked performed (e.g., commands sent, IRDs authorized, etc.) were nonexistent. Further, system functions were not based upon user IDs or functional roles. Therefore, system security was limited. Moreover, a control operator could not group commands and execute them as a single command to, for example, one or more of the IRDs. The operator did not have the ability to schedule commands for execution or to schedule changes to the program command. Among other problems, these drawbacks resulted in time-consuming and error-prone creation of broadcast schedules. For example, it was not uncommon that four days were required to build a monthly broadcast schedule for a single customer. Other problems with prior telecommunication systems are known to exist.

SUMMARY OF THE INVENTION

It is an object of the present invention to provide a telecommunication management system in which changes to selected system components, such as a group of integrated receiver/decoders, can be made by execution of a single command or macro.

It is a further object of the present invention to provide a telecommunication management system which operates in a shared-data environment. Data is maintained and updated at both a system database and at selected system nodes.

It is a further object of the present invention to provide a telecommunication management system, the operation of which is at least partially automated.

It is a further object of the present invention to provide a telecommunication management system in which commands being sent to one or more telecommunications network devices can be grouped together for execution at a single time.

It is a further object of the present invention to provide a telecommunication management system having multiple components and processes which are fully integrated and scalable.

To solve these and other objects of the invention and to overcome the drawbacks of prior telecommunication systems, a telecommunication system is provided. The system includes a broadcast site having a transmitter for transmitting a signal and an encoder for encoding the transmitted signal. The system has a plurality of reception sites, each having at least one integrated receiver/decoder. The system also has a satellite for relaying the signal from the broadcast site to each of the plurality of reception sites. The system also includes a management system. The management system includes a plurality of processes, the processes being integrated for managing one another and for managing the encoder and the plurality of integrated receiver/decoders. Each of the integrated receive/decoders is assigned to at least one of a plurality of satellite circuits. The management of the encoder and the plurality of integrated receiver/decoders is accomplished by using the management system to manage the plurality of satellite circuits.

Further objects, features and advantages of the present invention will be understood by those having ordinary skill in the pertinent art by reviewing the detailed description of the preferred embodiments in connection with the appropriate figures.

DETAILED DESCRIPTION OF THE PREFERRED EMBODIMENTS

Figure 1:
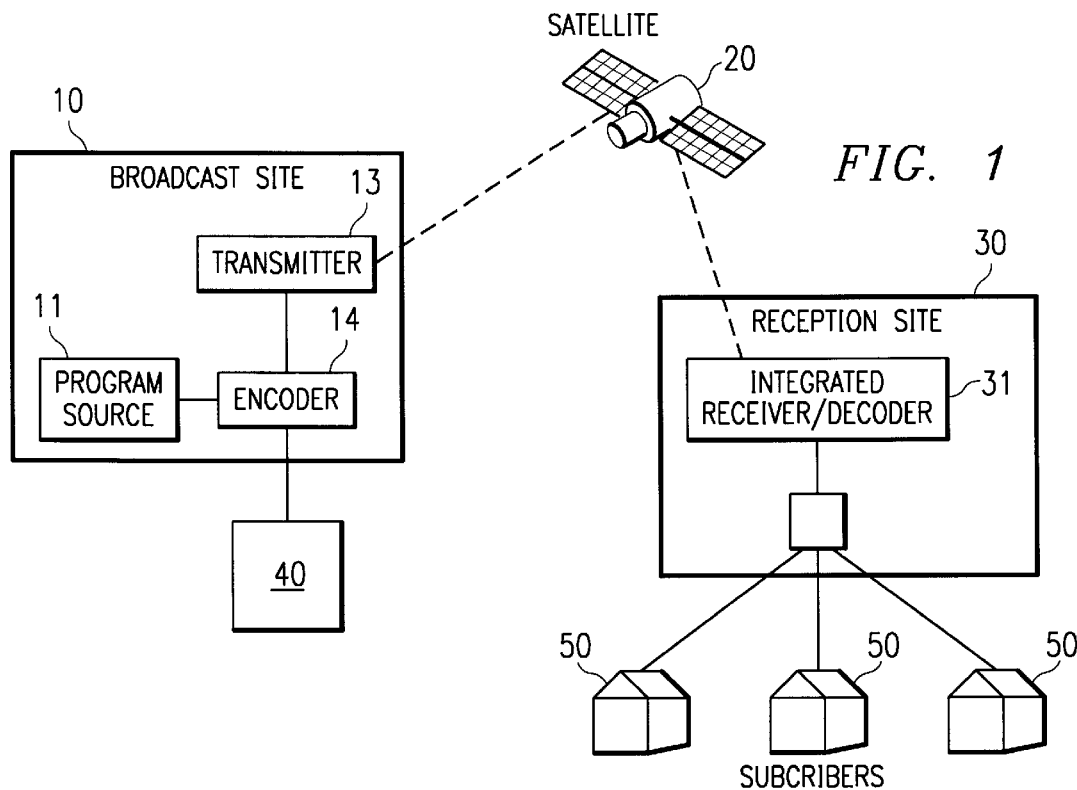
FIG. 1 is a block diagram representing a telecommunication network according to an embodiment of the present invention.

A telecommunication management system is provided for transmitting and receiving video broadcasts. The management system allows flexibility in changing the parameters of one or more characteristics associated with various hardware devices of the system. The system also allows flexibility and scalability in the different system components and processes. As shown in FIG. 1, a telecommunication network includes a broadcast site 10 for transmitting a program signal to a reception site 30. The signal is relayed from broadcast site 10 to reception site 30 by a satellite 20. The signal is passed from the reception site to a plurality of subscribers 50, which are each linked to the reception site by a suitable transmission medium (e.g., coaxial cable, optical fiber or both).

The signal preferably comprises both video information and data information and is generated by a program source 11. Preferably, the signal passes from program source 11 to an encoder 14, which encrypts the video information of the program. Encoder 14 is linked to a telecommunication management system 40. Preferably, management system 40 is linked to a plurality of broadcast sites 10 in a similar manner. The signal from encoder 14 is then passed to a transmitter 13, which transmits the signal to satellite 20. The broadcast site 10 is linked to management system 40 through a suitable interface. The operator can send program commands to the encoder to modify the data information being transmitted to the reception site. The program commands may be forwarded to any of the devices within the network.

The reception site 30 includes an integrated receiver/decoder ("IRD") 31. IRD 31 is capable of receiving and reading 3 both the video and data information contained in the program signal being relayed by satellite 20. IRD 31 includes a number of slots (preferably 32), each of which is capable of receiving and storing a set of preset decryption keys. Preferably, the data portion of the program signal includes a set of encryption information. The encryption information determines which decryption keys are necessary to decrypt the encrypted video portion of the program signal. IRD 31 is capable of reading the encryption information from the data information, and is further capable of comparing the encryption information to the decryption keys stored in each of its slots. If this comparison results in a match, the IRD is enabled to receive and decrypt the video information of the program signal. The decoded signal is then passed via other known components to the plurality of subscribers linked to the reception site.

Preferably, the network includes a plurality of IRDs 31, which are located in one or more reception sites 30. One or more of the plurality of IRDs 31 are assigned to a common satellite circuit. The satellite circuit is an integrated group of IRDs and represents a common link between the circuit IRDs and an operator of management system 40. As discussed above, a system operator can send a program command to encoder 14. The program command changes the configuration of the satellite network. This change results in a corresponding change in the configuration of each IRD assigned to the satellite circuit.

The program command is a data-driven command which is capable of initiating one or more of a variety of functions by changing the parameters of the satellite circuit.

Preferably, these functions include changing an existing set of decryption keys, adding a new set of decryption keys, authorizing a new service, authorizing a new broadcast, deauthorizing a service or broadcast, making an authorization or deauthorization temporary, assigning an IRD to the satellite circuit, deleting an IRD from the satellite circuit. Therefore, the program command affects one or more characteristics of the network configuration. Program commands which affect IRD functions are sent to the IRDs by an encoder or group of encoders.

Preferably, the program command includes one or more pieces of data from a database. The database should be configured to allow the management system 40 to operate on a shared-data basis. That is, data may be shared between the system operator's workstation, other user workstations, the various management system servers and the database. Persistent data should reside in the database, but should be accessible by the workstations and the local server. Preferably, changes to the data which are entered at one of the workstations automatically trigger corresponding updates to the shared data located at other workstations, the system servers and the database. Similarly, changes made by users should automatically trigger corresponding updates to other workstations and the database. For example, when a program command is executed, relevant audit information is automatically saved in the database so that it may later be accessed by an operator. Also, changes to client information are automatically saved. Preferably, the database is configured so that all initial information and any changes thereto are structured in such a manner as to allow reports of such information to be automatically generated. The database may be, for example, an Oracle database.

I. Management System Overview

Management system 40 will now be described in greater detail. The telecommunication management system provides a means for managing a broadcast network. The network is generally responsible for performing video compression and satellite transmission of video broadcasts. In particular, the management system helps manage a network of devices including integrated receiver/decoder (IRD) equipment that are used to receive satellite transmissions at various sites within the network. The management system provides at least the following capabilities: (1) provides new customers and customer equipment (IRDs); (2) authorizes and installs IRDs on the networks; (3) sends commands to specific IRDs on the network; (4) transmits and manages a program data stream ("PDS") to allow IRDs to receive a video broadcast. Preferably, customer and IRD information is maintained in an central database (e.g., an Oracle database). Various reports can be generated from the data in this database. Additionally, a series of administrative editors provides an ability to maintain a system configuration which is data-specific to each customer.

With respect to hardware and software processes, the management system preferably operates in an environment employing a distributed architecture. In this environment, devices responsible for event processing are physically separated from those providing user interface facilities.

Figure 2:
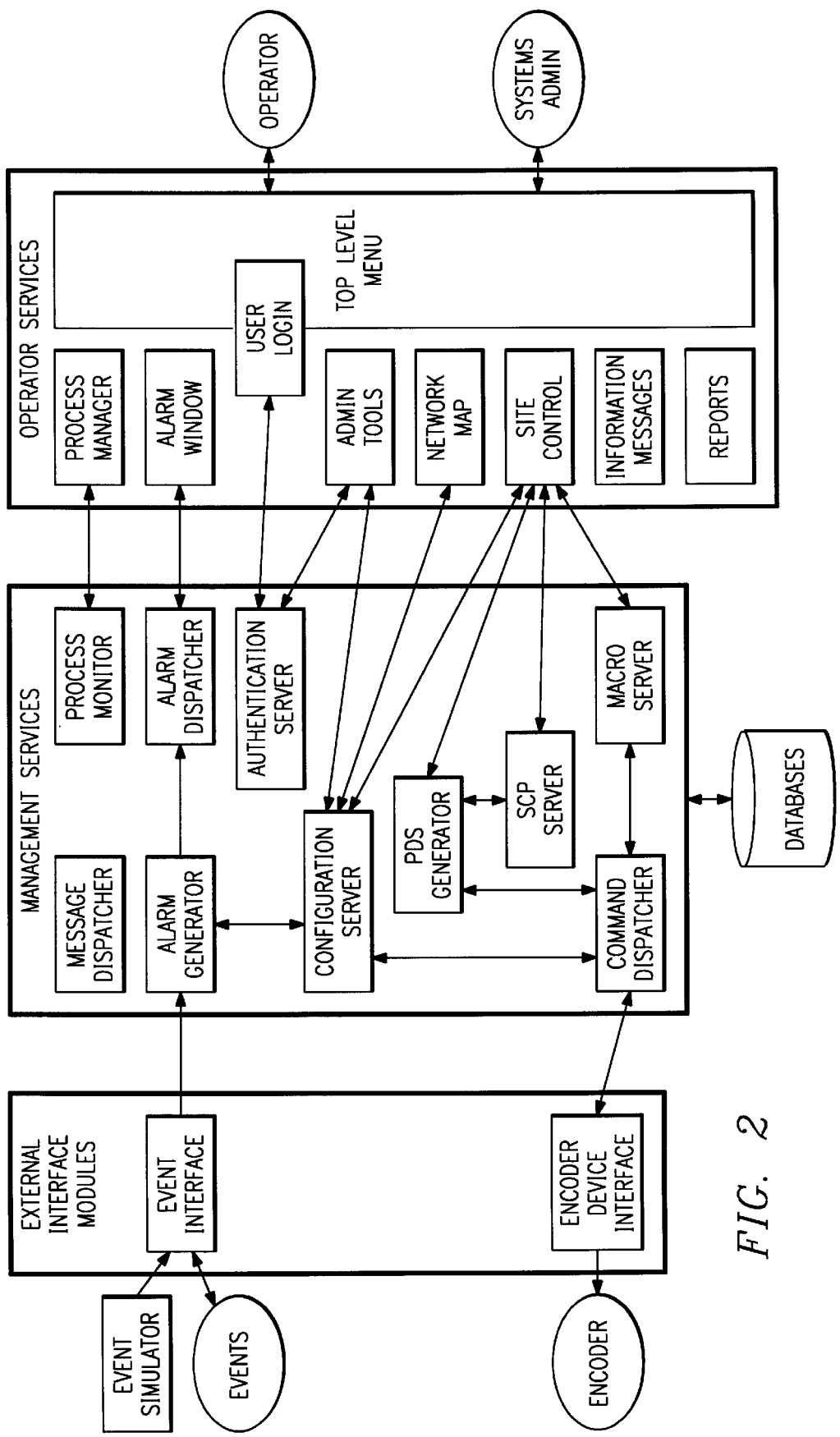
FIG. 2 is a block diagram representing a management system of the telecommunication network of FIG. 1.

Preferably, the management system is an object-oriented software system as implemented using SNAP™ and the C programming language. SNAP™ is a Strategic Networked Application Platform and is available, for example, from Template Software™. The application architecture should be highly distributed. The major components of the application architecture are shown in FIG. 2, in which boxes represent physical processes and significant process modules. For convenience, only the principal inter-process communication links are shown in FIG. 2. Greater detail regarding the interfacing of the various components and processes is provided below.

The management system preferably uses a multi-process approach in order to design for scalability. Each process is responsible for a distinct functional area of the system and multiple copies of most processes can be deployed in order to increase the system performance.

The management system processes use efficient interprocess communication techniques to exchange information. Interprocess communication may be implemented, for example, via remote procedure calls via a Shared Information Base ("SIB"). SIB is a bundled feature of SNAP which provides the ability to broadcast changes to shared data to registered client processes. Selected system data is kept in both the system database and on the system servers. Processes on user workstations can use interprocess communication to access both main memory and disk-based data.

The major processes of the management system application are each located within cone of three components. The first component, Operator Services, provides a layer of user visibility and access into the second component, Management Services. The Operator Services component provides such services as user log-in, network mapping, site control, message windows, reports generation, administrative tools, process manager, and alarm window. Each user on the system has its own copy of the Operator Services component software and hardware. The second component is Management Services, which supports the management system as a whole. This component provides security control, alarm routing and application infrastructure on behalf of all system users. The third component is External Interfaces and is responsible for communicating directly with external systems and devices. This component includes a number of interfaces that receive and format raw data for analysis as well as attaching necessary communication protocols to outbound transactions going to the external systems and devices. In addition to these three major components, the management system uses one or more logical databases to provide persistent data storage of application data as well as system configuration data.

II. Operator Services

The Operator Services component will now be described in greater detail. As discussed above, the Operator Services component provides such functions as user log-in, network mapping, site control, message windows, reports generation, administrative tools, process manager and alarm window. Its major associated processes include at Top Level Menu process, Network Mapping process, a Site Control process, and a Process Manager process. The Site Control process includes an IRD Management process, Site Management process, Command process, Macro process, SCP process, and PDS Manager process. For clarity, however, each of the processes included in the Site Control process will be discussed separately.

The Top Level Menu encompasses user login, administrative tools, user interfaces including an interface for generating reports, and message windows. The Top Level Menu process collects and verifies a user's ID and password information, as well as functional role information and displays the various menu options available within the Operator Services component. It also initiates the start-up of a set of user interface processes via a Process Monitor, invokes user windows associated with these processes, and requests termination of the processes upon shutdown of the management system. The Top Level Menu process also includes administrative tools editors for configuring system operator and network default information, and supports the user interface related to the generation of management system reports.

With respect to logging in, the Top Level Menu process is the only means by which an operator may gain access to the services provided by the rest of the management system. The user ID and password are collected from the user and passed to an Authentication Server for validation. Only those windows, menu entries, and other associated interfaces specifically permitted for the particular user are enabled.

Figure 3:
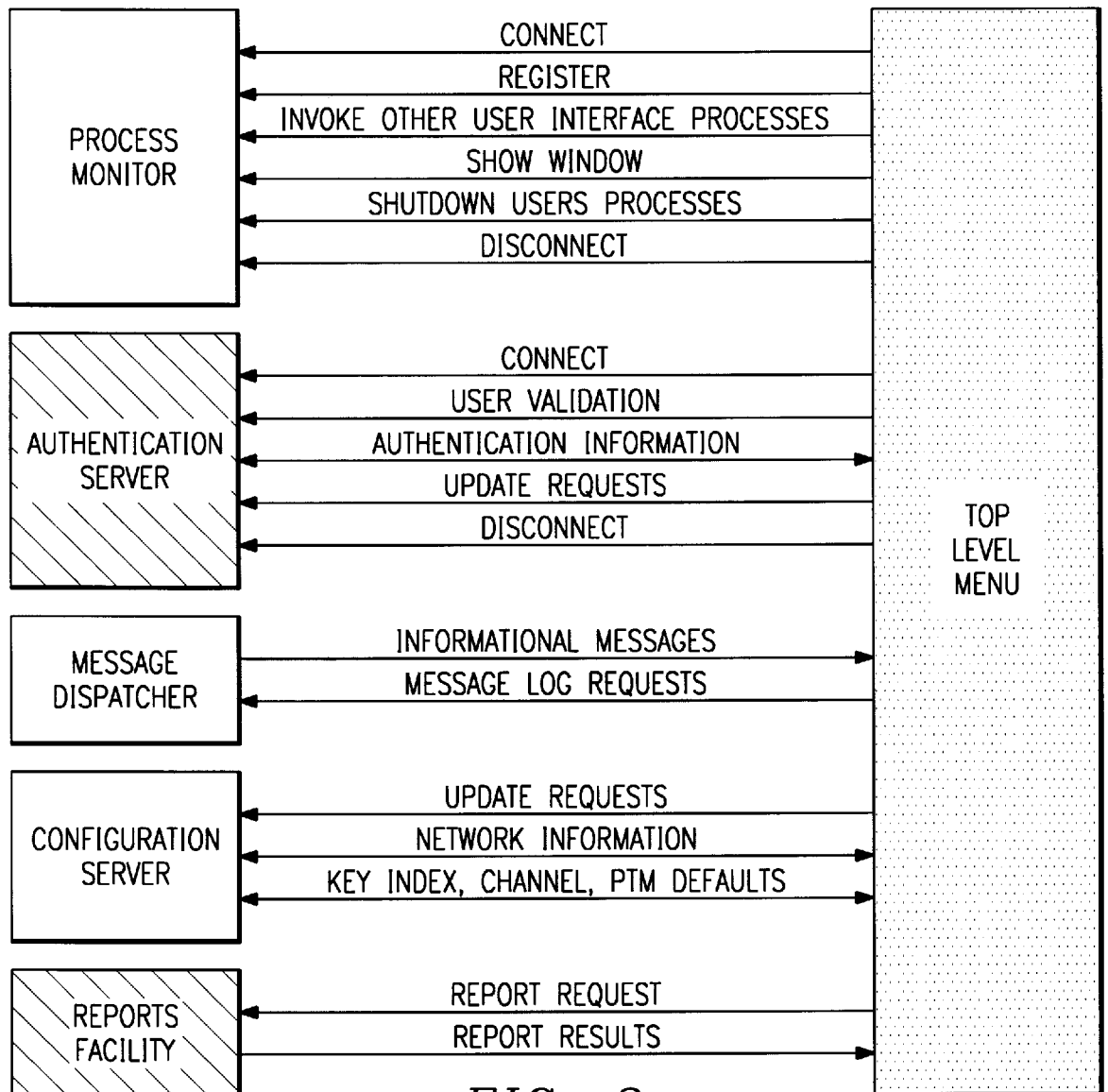
FIG. 3 is a block diagram representing the interfacing between a process of the management system of FIG. 2 and the remainder of the management system of FIG. 2.

The interfacing of the Top Level Menu process with the remainder of the management system is shown in greater detail in FIG. 3. The top level menu process connects to a Process Monitor process to register, to invoke other user interface processes, to invoke windows within other user interface processes, and to shut down all related user interface processes when a user logs out.

The Top Level Menu process also connects to an Authentication Server process to verify user IDs and password information, and to gather a list of user-specific privileges. These two processes are also connected whenever a request is made for maintenance on user or operator rule information by way of an administrative tool's access control option.

The Top Level Menu process also connects to a Message Dispatcher process by way of an informational message window. Messages are automatically forwarded from the Message Dispatcher to the informational message window using a SNAP™ shared information base ("SIB") Autoget dispatching facility when a user logs into the system. Messages can be originated by external systems within the overall telecommunications network as well as by the processes and components of the management system itself.

The Top Level Menu process also connects to a Configuration Server to request information such as networks and encoders currently controlled by the management system. Other information received from the Configuration Server includes network-specific key indices, channel and program tier mask ("PTM") default information. Updates to these objects may be performed through this connection.

The Top Level Menu process also interfaces with a system database reports facility anytime a request for a report is generated. Depending upon the request, a return request may be provided to the user soliciting further information such as report criteria or parameters. Once the reporting criteria is specified, the report is generated as a system command invoking the reports facility.

Another process within the Operator Services component is the Network Mapping process. This process graphically displays information about the entire telecommunication network. Preferably, information is available at different levels, including network, regional, site and device levels. Information should be displayed in a view-only mode as the Network Mapping process preferably serves only as a network navigational tool. When regional information is displayed, an operator can view information regarding sites in a particular region. Selecting a site allows an operator to display information regarding the devices at a particular site. For example, the operator can display a list of authorized IRDs at a particular site. The information can be configured to various formats. For example, the Network Mapping process can be configured to display IRD serial numbers as well as the channel to which an IRD is tuned.

Figure 4:
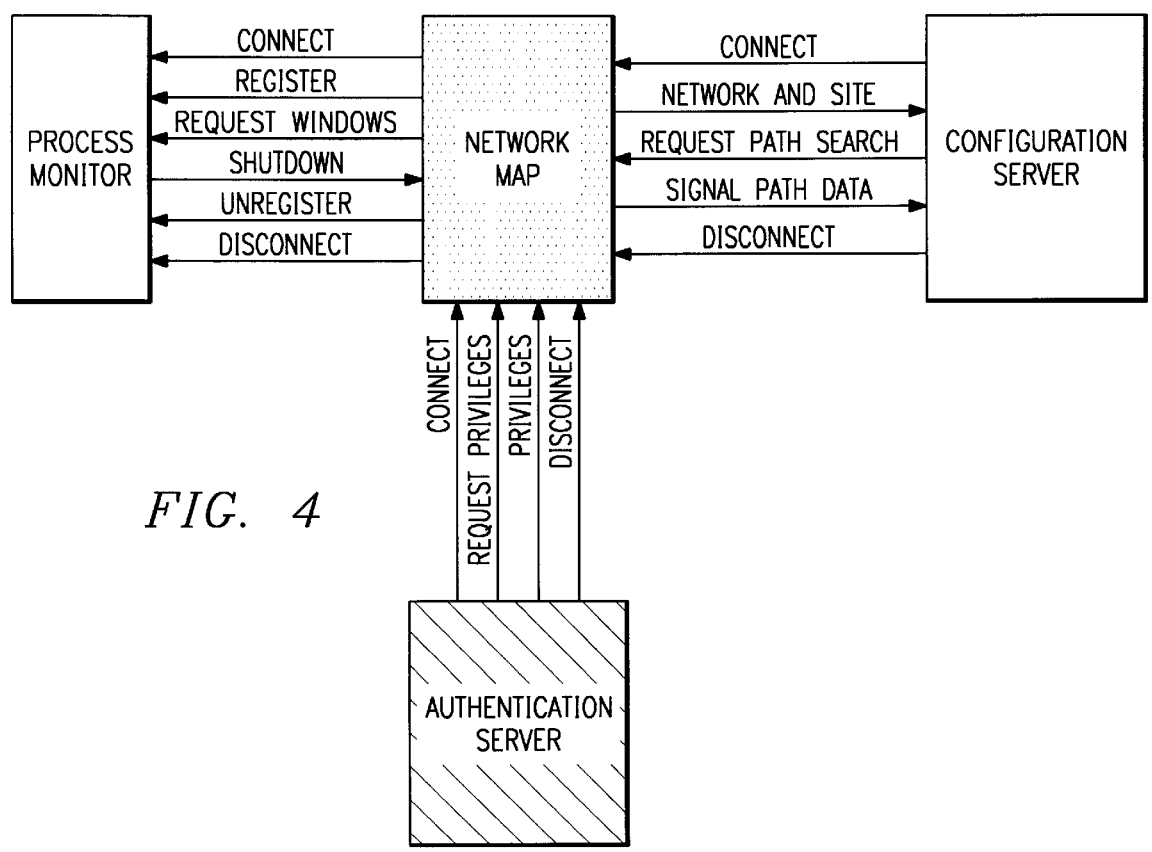
FIG. 4 is a block diagram representing the interfacing between a process of the management system of FIG. 2 and the remainder of the management system of FIG. 2.

The interfacing between the Network Mapping process and the remainder of the management system is shown in greater detail in FIG. 4. Preferably, the Network Mapping process registers itself and any of its associated windows with the Process Monitor. The Process Monitor can process requests to show network map windows and to shut down the Network Mapping process. The Network Mapping process also connects to the Configuration Server to obtain network, regional, site and device information needed to display the network maps at the user stations. The Network Mapping process also connects to the Authentication Server process to obtain a list of user-specific privileges, which represent valid functions available to a particular user.

Another major process within the domain of the Operator Services component of the management system is the Site Control process. This process provides an number of distinct functions including providing a user interface for loading and updating, data received from external systems, for maintaining site level information, for issuing commands to network devices and for monitoring and transmitting a PDS. Thus, the Site Control process is comprised of six major subprocesses, including an IRD Management process, Site Management process, Command process, Macro process, PDS Manager process and SCP process. These subprocesses are described separately below. However, it will be understood that all of these processes fall within the Site Control process.

Figure 10:
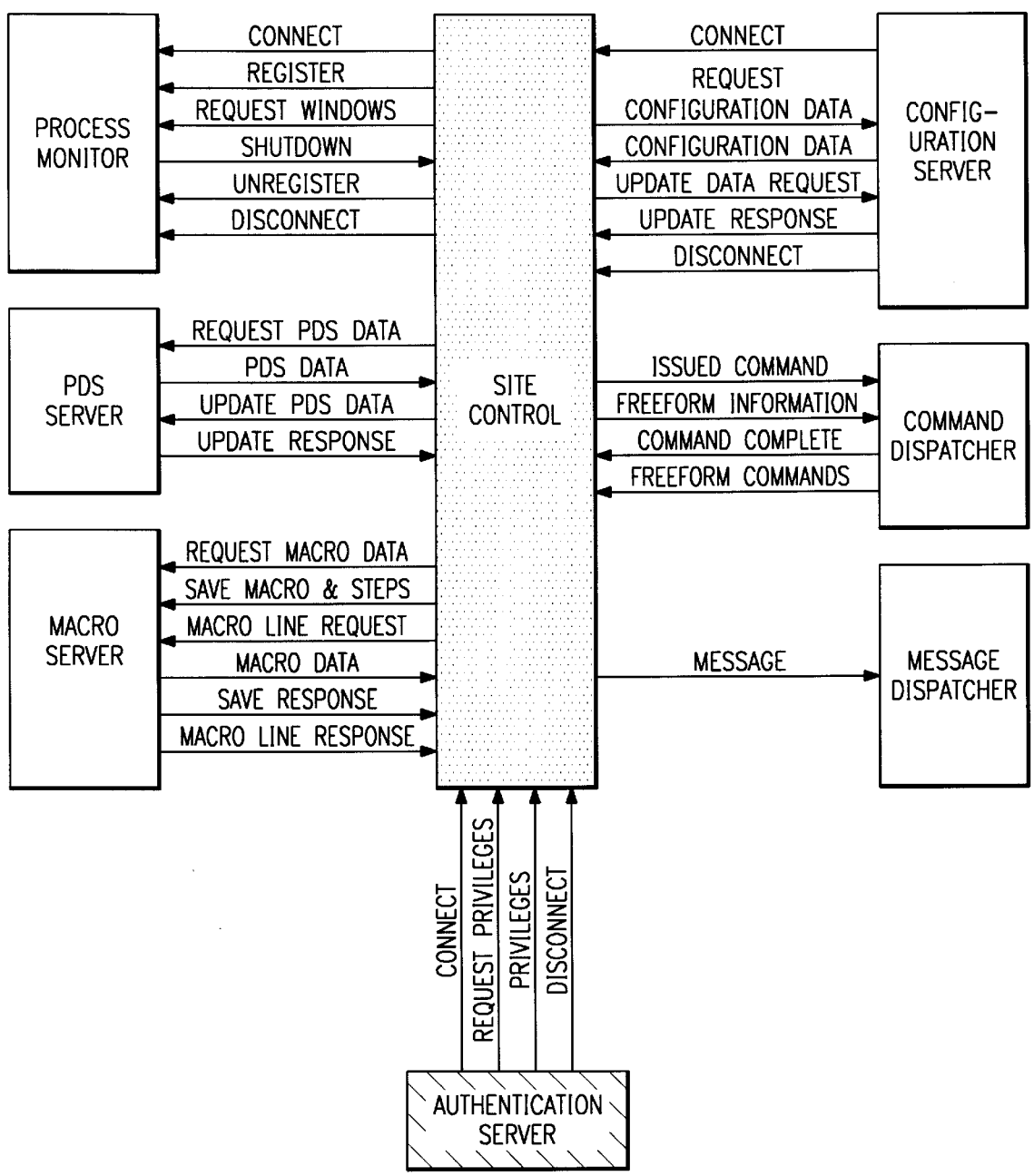
FIG. 10 is a block diagram representing the interfacing between a process of the management system of FIG. 2 and the remainder of the management system of FIG. 2.

The interfacing between the Site Control process and the other components of the management system is shown in greater detail in FIG. 10. The Top Level Menu process is responsible for initiating the Site Control process after a user has successfully logged on. The Site Control process registers itself (including any of the relevant subprocesses) and any associated windows with the Process Monitor. The Site Control process is also connected to the Authentication Server to obtain a list of user-specific privileges, which represent the available functions for the particular user. The Site Control process requests information from the Configuration Server such as Site and IRD information. Updates to these objects are also accomplished through this connection. The Command Dispatcher receives commands from the Command process and directs the commands to the appropriate destination device for execution. The Site Control process also communicates with the Command Dispatcher to maintain a list of valid freeform commands. The Site Control process is also connected to the Message Dispatcher to send messages to be logged to the database and displayed through the message windows in the Top Level Menu process. The Site Control process also requests information from the PDS Server such as network channel defaults, key index defaults, and SCPs. Updates to these objects can also be performed through this connection. The Site Control process also communicates with the Macro process to add, delete and update system macros. The Site Control process also communicates with the SCP Server to update a broadcast schedule due to satellite circuit changes.

A subprocess included in the Site Control process is the IRD Management process. This process provides a user interface to manage the network of IRDs. Within a selected Satellite Network, the IRD Management process provides the ability to make new IRDs available for use, load IRD software, extract IRDs from the network for resale, make deauthorized IRDs available for use, and delete IRDs from the particular Satellite Network.

The IRD Management process comprises five major subprocesses. The first major subprocess is the loading of new IRDs. New IRDs may be added to the network, for example, by loading them from a diskette received from the manufacturer. The diskette may contain IRD serial numbers and other associated information and values. The second major subprocess is the loading of IRD software. The IRD manufacturer may provide IRD operating software on diskette each time the software is upgraded. This software may be downloaded to the IRDs over one or more Satellite Networks. A command window within the Operator Services component is responsible for retrieving the software version from the server and initiating a software download command to upgrade the IRDs in the network. The third major subprocess is the reselling of IRDs. If a particular network contains excess IRDs, these IRDs can be extracted from the network and resold back to the manufacturer or to other customers. The fourth major subprocess is the moving of IRDs to a pool designated as "available." Before an IRD is assigned to a particular site, it should be placed in the "available" pool. For example, if an IRD was previously deauthorized and subsequently fixed, an operator may wish to make the IRD available for use by moving it from a "deauthorized" pool to the "available" pool. The fifth major subprocess is the deletion of available IRDs. For example if an IRD was mistakenly loaded into the network from a manufacturer's diskette, it may be removed or deleted from the network through this subprocess. These five major subprocesses of the IRD Management process may be performed by an operator through the user interface available within the Operator Services component and by way of retrieval and updating of data obtained through the Configuration Server.

Figure 5:
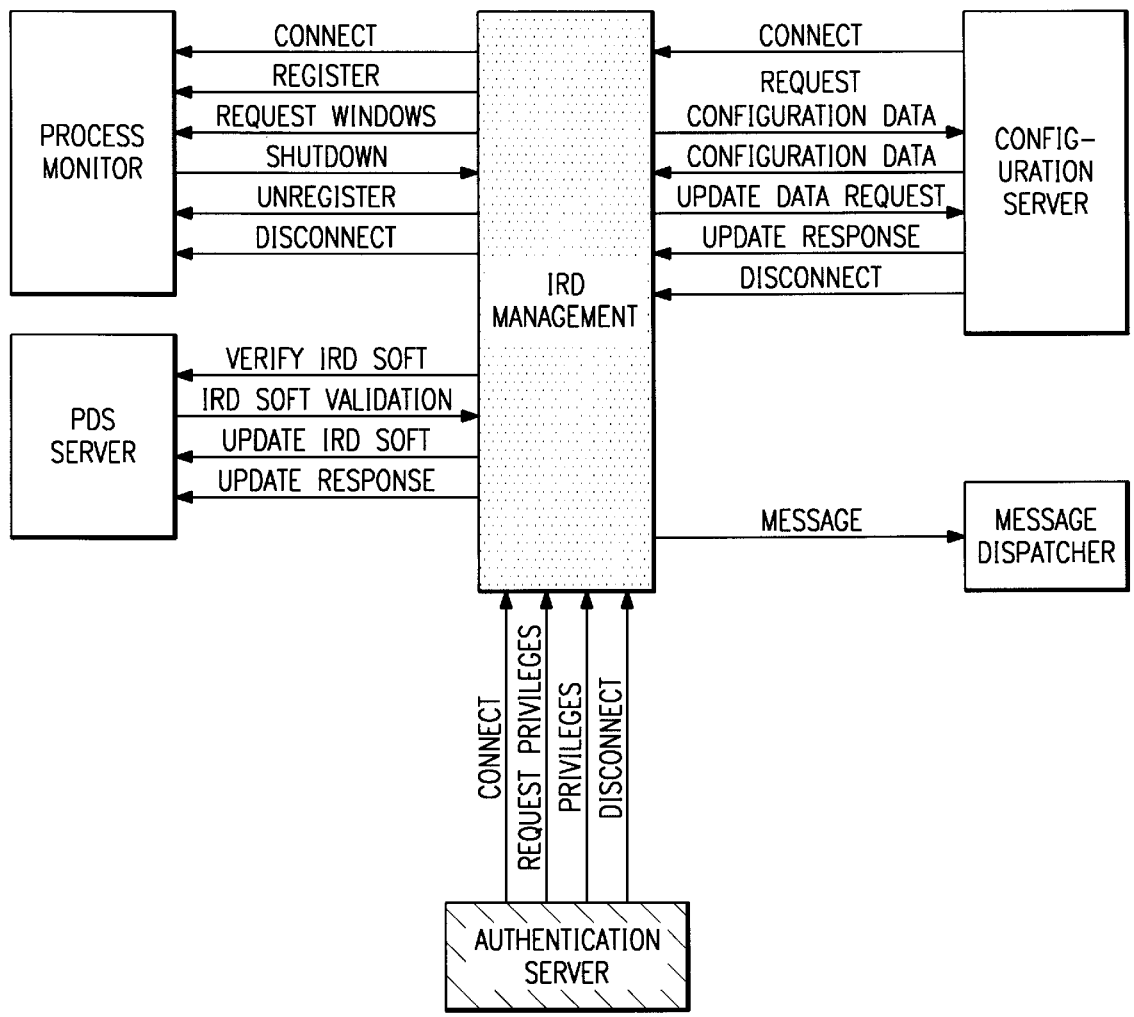
FIG. 5 is a block diagram representing the interfacing between a process of the management system of FIG. 2 and the remainder of the management system of FIG. 2.

The interfacing of the IRD Management process with other processes within the overall management system is shown in greater detail in FIG. 5. The IRD Management process is preferably initiated by a user through the Top Level Menu process after the user has successfully logged on. The IRD Management process registers itself and any of its associated windows with the Process Monitor which can then process any user-generated IRD Management requests. The IRD management process also connects to the Authentication Server process to obtain a list of user-specific privileges. The IRD Management process requests configuration information from the Configuration Server such as "deauthorized" and "available" IRDs. Updates to this information are also performed through this connection. The IRD Management process is also connected as a client process to the Message Dispatcher process. The IRD Management process also interfaces with the Program Data Stream Server ("PDS Server"). Through this connection, the IRD Management process can validate IRD software versions. Updates to IRD software versions may also be performed.

Another subprocess within the Site Control process is the Site Management process. The Site Management process provides a user interface to manage network-specific site data by performing all changes to sites, site equipment and site related data in a predetermined, controlled manner. The Site Management process preferably allows a user to search for site and IRD information, install sites, track site problems and de-install sites. This process should also allow the user to add, copy/add, update, rename, and delete the satellite circuits. Also, the user can assign an identifier label to each bit position within a program tier mask ("PTM") for a specific key index within a specific network. Further, a user can install, swap and de-install IRDs from a site using the Site Management process.

The Site Management process comprises three major subprocesses. The first major subprocess is the Search process. This subprocess allows a user to enter specific search criteria related to a site which will then be used for selection purposes relative to the system databases. The Search subprocess also allows a user to view or print specific site-related information based on the search criteria entered. The second subprocess is the Site subprocess. This subprocess allows the installation of new sites to the database with assigned and authorized IRDs. The Site subprocess may also allow a user to stack and add to the database a new problem for a particular site. Site problems may include, for example, a situation in which an IRD is not receiving a signal or has crashed. In this case, a field technician may be assigned to fix the problem and this activity can be tracked by the Site subprocess. Another example is when an IRD is receiving the wrong broadcast. The IRD may have drifted off its home channel. In this case, a command may be sent to the IRD via the management system. The Site subprocess may also be used to de-install a site from the network. This results in the deauthorization of IRDs from the site and all site-related data is deleted from the database. Preferably, no historical information is maintained. However, the system may be configured to save selected historical information. The Satellite Circuit subprocess provides several functions. First, a new satellite circuit may be added to the database. Preferably each satellite circuit is identified by a name, description, and at least one key index. A key index can generally be described as a unique number assigned to a particular slot in an IRD. Each defined key index should have a network level defaulted service authorization mask ("SAM"), key tag, program key ("PKey"), and PTM. All of these values may be updated by the user. The Satellite Circuit subprocess may also be used to copy and/or add a satellite circuit definition to the database under a user-provided new satellite circuit name and description. The Satellite Circuit subprocess may also be used to update a satellite circuit definition within the system databases. The satellite circuit description and the number of key indices defined may be updated by a user. Additionally, the user should be able to update any key index parameters such as the SAM, key tag, PKey, and PTM. The Satellite Circuit subprocess may also be used to rename a satellite circuit within the database. This subprocess may further be used to delete a satellite circuit from the database. This subprocess may also be used to assign an identifier label to a bit position within the PTM for a specific key index within a specific network.

Figure 6:
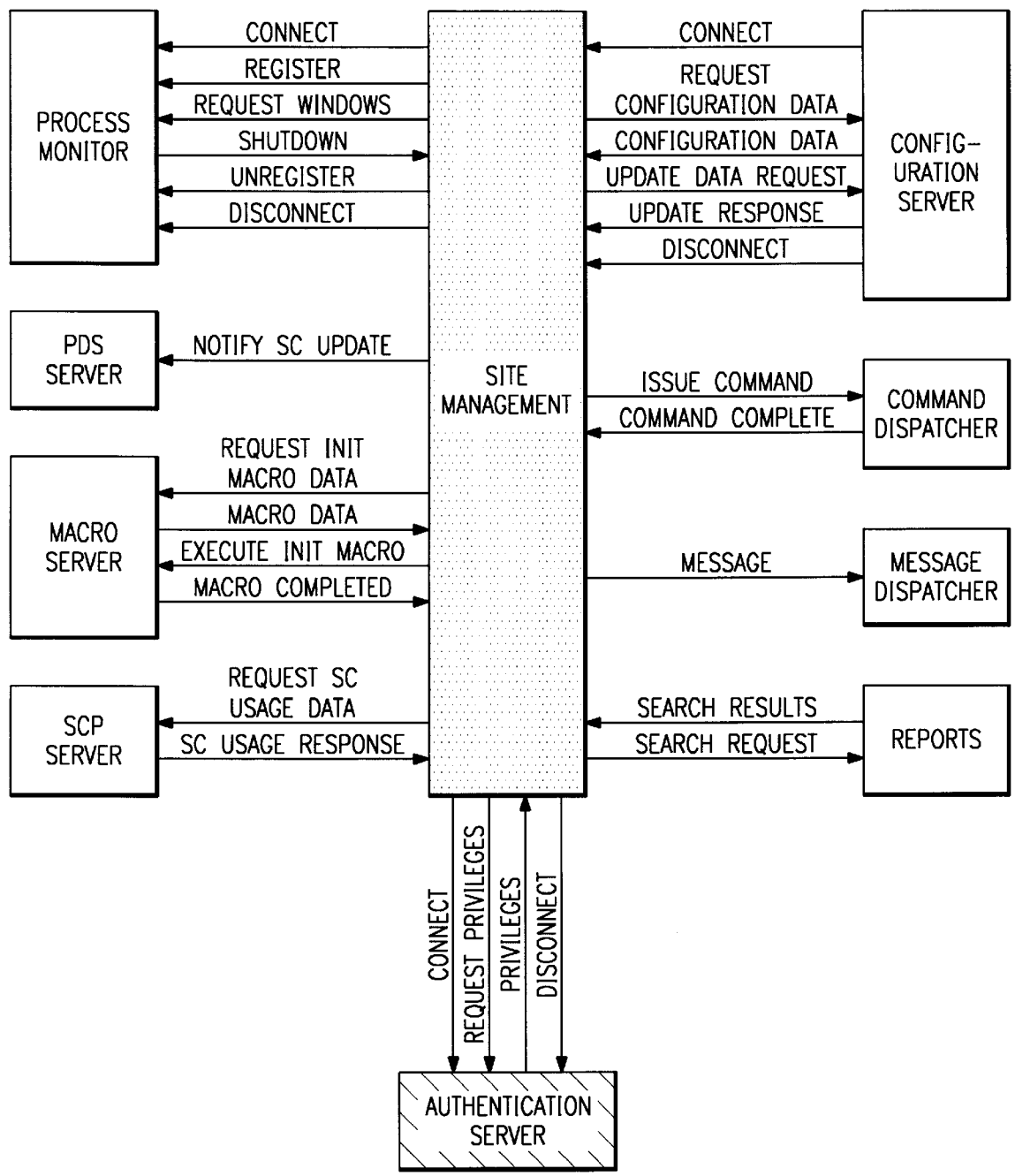
FIG. 6 is a block diagram representing the interfacing between a process of the management system of FIG. 2 and the remainder of the management system of FIG. 2.

The interfacing between the Site Management process and the remainder of the management system is shown in greater detail in FIG. 6. As with several other processes, the Top Level Menu process is responsible for initiating the Site Management process. The Site Management process registers itself and any of its associated windows with the Process Monitor. The Site Management process also is connected to the Authentication Server process to obtain a list of user-specific privileges. This list includes specific privileges for Site Management access. The Site Control process requests configuration information from the Configuration Server. For example, the Site Management process may require site, IRD, encoder, and satellite circuit-related information. Updates to these objects are also performed through this connection. Therefore, for the Site Management process, all data requests, updates and deletions are handled by the Configuration Server. The Site Management process is also connected to the Command Dispatcher process. The Command Dispatcher receives authorization data stream ("ADS") and initialization macro command bundles from the Site Management process and directs the commands to the appropriate Device Interface within the External Interface 3 component for execution. The Site Management process is also connected to the Message Dispatcher process and sends messages there to be logged on the database and displayed through message windows within the Operator Services component. The Site Management process also notifies the PDS Server when a satellite circuit has been updated. This action triggers the PDS Server to recalculate the PDS PTM for any scheduled or active Satellite Circuit Plan ("SCP"). The Site Management process communicates with the Macro Server process to obtain and validate the network-specific initialization macro. The macro commands are bundled and executed through the Command Dispatcher as described above.

Another subprocess within the Site Control process is the Command process. This process provides a user interface for executing device commands, maintaining freeform commands and receiving encoder status information. The Command process allows an operator to issue specific commands to the various devices within the network. An operator may select a command category (e.g., based on the destination device) and may select from a list of commands applicable to the destination device. The operator can then complete the command by choosing from a list of parameters and by choosing a destination. Valid parameter values for IRDs and encoders may be predetermined and preset, for example, by the manufacturer of the IRD or encoder. The Command process can validate the user-entered parameters against the predefined valid values.

Examples of devices that can receive commands include IRDs, data expansion units ("DEUs"), encoders, and Video Cassette Recorders ("VCRs"). Commands to all devices are initially sent to at least one encoder, but commands sent to devices other than encoders do not have the designated encoder as the command's final destination. Thus, the command types are preferably classified according to their final destination device.

The Command process should also enable the user to define commands that are not predefined within the management system. These commands are called, for example, "freeform" commands. The available commands should at least include predefined commands for encoders, IRDs, DEUs and VCRs. The available commands should also include freeform commands for each of these devices. Other available commands should include "IRD add teletext," "IRD remove teletext," and "IRD software download" commands. In certain cases, a single logical command may be used to include several separate device commands.

In the case of the IRD, DEU and VCR commands, a user can select one or more encoders in order to direct the command. Preferably, the user chooses a device destination, such as an individual IRD address in the network, a group of IRDs specified by a key index and PTM value, or all IRDs. In the case of encoder commands, the user should only be able to select one encoder as the destination for the command.

Predefined commands should be available on the database. Freeform commands should be able to be saved to the database for execution at a later date and/or time. An access security level should be associated with each command type and also with each destination device. For example, the more powerful the command type the higher the access privilege. Commands are sent via the Command Dispatcher to the appropriate Device Interface.

Figure 7:
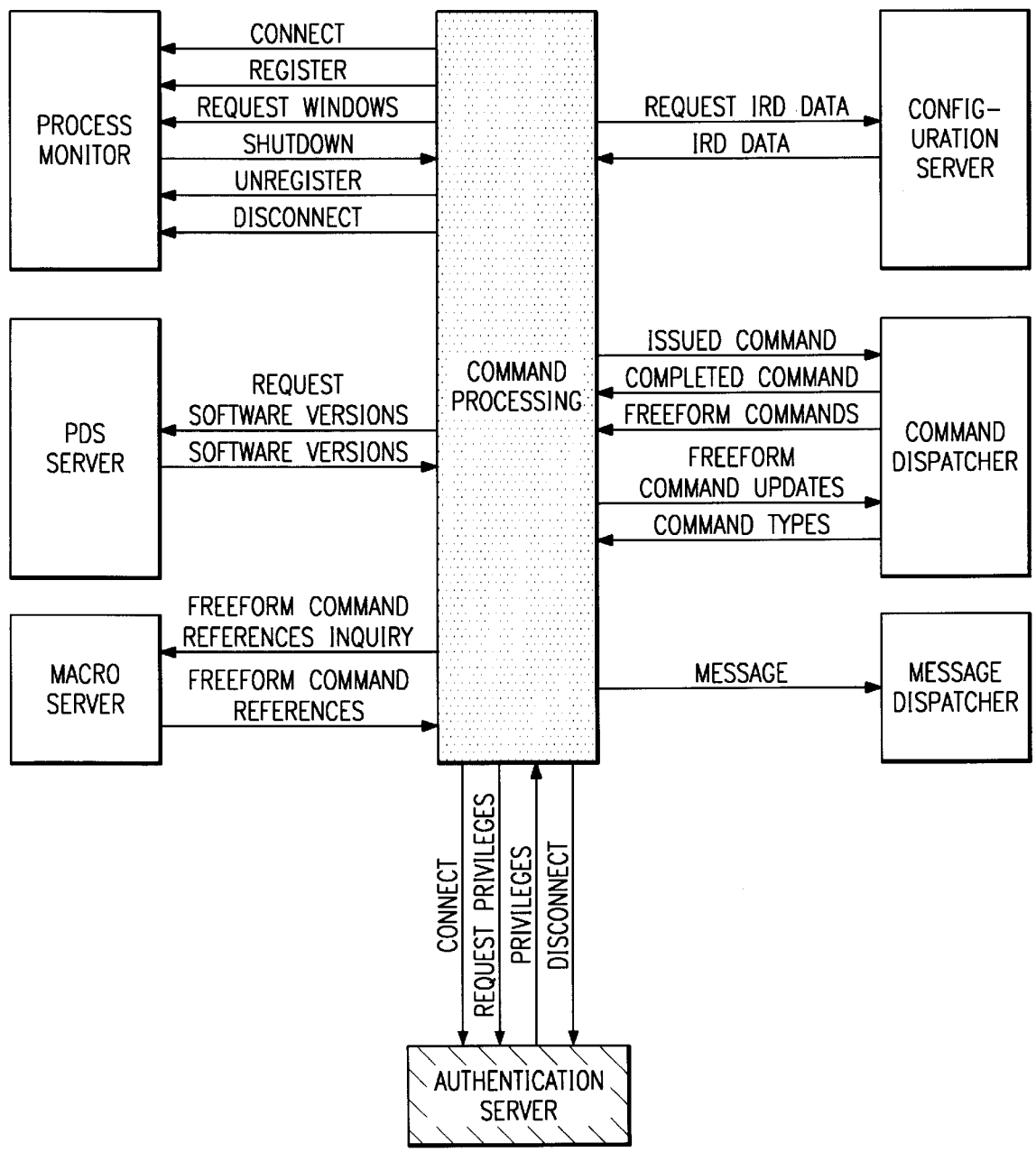
FIG. 7 is a block diagram representing the interfacing between a process of the management system of FIG. 2 and the remainder of the management system of FIG. 2.

The interfacing of the Command Process with the remainder of the management system is shown in greater detail in FIG. 7. The Top Level Menu process is responsible for starting the Site Control process which includes the Command process. The Command process registers itself and any associated windows with the Process Monitor. The Command process also connects to the Authentication Server process to obtain a list of user-specific privileges representing the valid functions available to the particular user. The Command process request configuration information from the Configuration Server such as IRD data. The Command process validates such information as IRD serial numbers entered by the user through this connection. For example, the Command process should determine whether a particular IRD serial number designated as the destination device exists within the database, whether the IRD serial number is "authorized" for the selected network (e.g., satellite network), and that the IRD serial number is not authorized for a different network. The Command process also receives the channel for a specific IRD serial number in order to properly select the appropriate encoder destination through which the command to the IRD will be sent. This structure is similar for DEUs and VCRs.

The Command Dispatcher receives commands sent from the Command process and directs commands for execution to the appropriate Device Interface within the External Interfaces component. The Command Dispatcher also sends a command result indicating success or failure back to the Command process. The result should indicate the success or failure of the command being sent to the device and not the actual success or failure of the execution of the command. For encoder commands, a response may also be returned to the Command process from the Device Interface process via the Command dispatcher. The Command process also communicates with the Command Dispatcher to maintain a list of valid freeform commands. The Command Dispatcher maintains freeform commands by reading and/or writing the commands from and to the system database. The Command process is also connected to the Message Dispatcher process. The Command process sends messages to the Message Dispatcher to be logged to the system database and displayed through message windows within the Operator Services component. The Command process sends a message to the Message Dispatcher that details each command that is sent. Through a command window, a user can request all the known software versions from the PDS Server. This information is presented to a user when the user chooses to send an IRD software download command and wishes to choose the software version for the command by picking from a list. The Command process also communicates with the Macro Server process when the user attempts to delete a freeform command.

Another subprocess within the Site Control process is the Macro process. The Macro process provides a user interface to maintain and control the execution of command macros. A command macro consists of one or more commands grouped together to perform a logical function or a logical group of related functions when executed. Preferably, the Macro process allows macros to be manipulated through several user actions. These actions can be initiated by the user through a macro manager window which is accessed from the Top Level Menu process by choosing the Macro process and then the macro management window. The user has the ability to begin the creation of a new macro, copy an existing macro, delete a macro, rename an existing macro, edit an existing macro, schedule a macro for execution, or immediately execute a macro. With respect to scheduling, a user can schedule a macro to begin execution at a particular date and time and can specify if the macro is to be executed once or periodically. Macros are preferably classified as "pending," "executing," or "completed." Preferable, a user can manipulate "pending" macros by placing a scheduled pending macro on hold, releasing a held macro, editing a pending macro, viewing the steps for the macro, and canceling the macro. With respect to "executing" macros, a user should be allowed to place the "executing" macro on hold, release a held macro, view the steps for the macro, view the execution status for the steps of the macro, or cancel the macro. With respect to "completed" macros, a user should be allowed to view the steps for a "completed" macro or a canceled macro, view the execution status of each step of the macro, and acknowledge or delete the macro.

Figure 8:
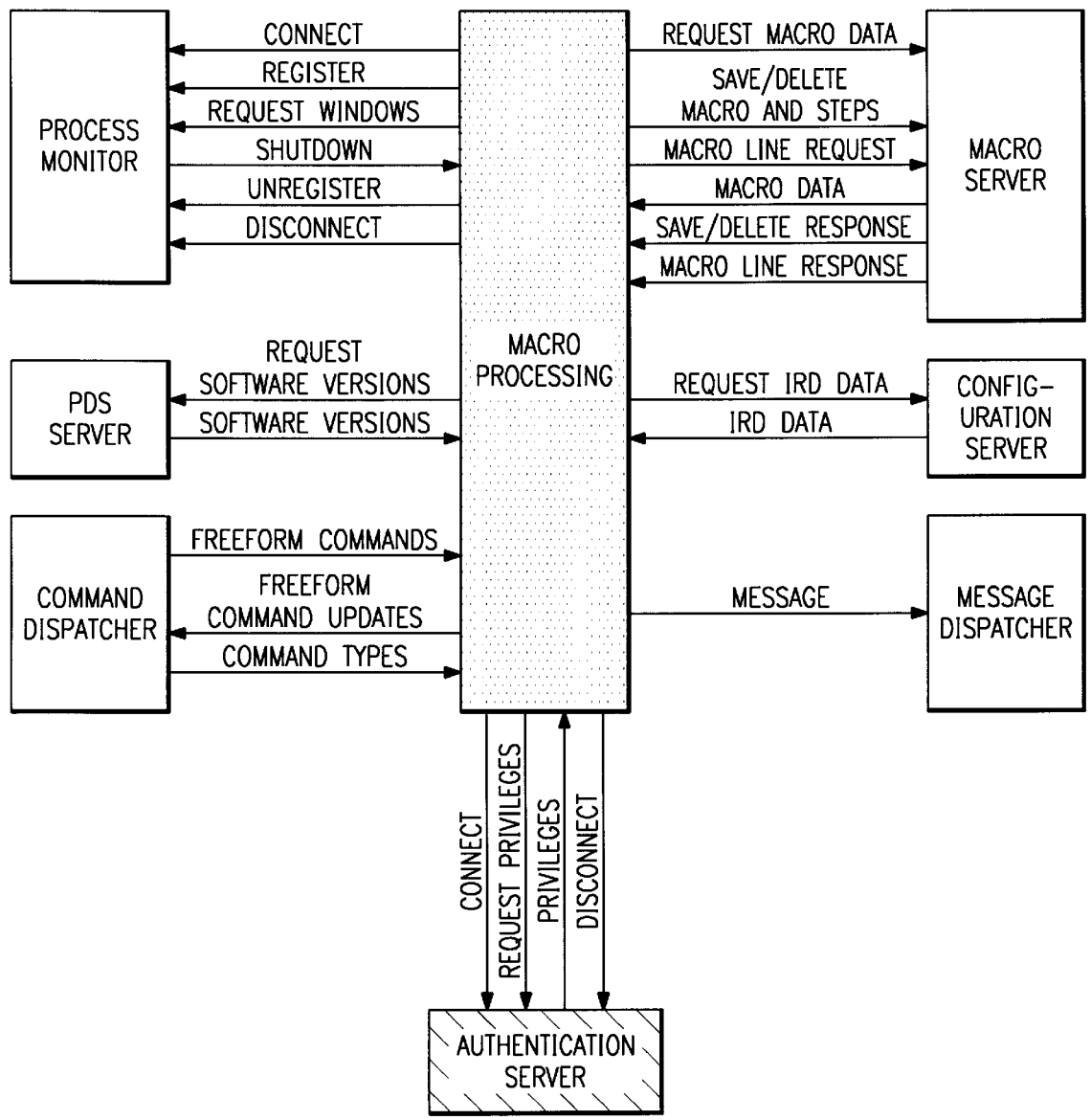
FIG. 8 is a block diagram representing the interfacing between a process of the management system of FIG. 2 and the remainder of the management system of FIG. 2.

The interfacing of the Macro process with the remainder of the management system is shown in greater detail in FIG. 8. The Top Level Menu process is responsible for initiating the Macro process. The Top Level Menu process initiates the Macro process after a user has successfully logged on.

The Macro process registers itself and associated windows with the Process Monitor. The Macro process also connects to the Authentication Server process to obtain a list of user-specific privileges. The Macro process requests configuration information from the Configuration Server. Such information can include, for example, IRD data. For instance, the Macro process can validate IRD serial numbers entered by a user through this connection. The Macro process also should be able to receive the channel for a specific IRD serial number in order to preselect a proper encoder destination.

The Macro process communicates with the Command Dispatcher to maintain a list of valid freeform commands. The Command Dispatcher maintains freeform commands by reading and/or writing the commands from and to the system database. The user can save, replace and delete freeform commands.

The Macro process is connected as a client to the Message Dispatcher process. The Macro process, through its associated windows, sends messages to the Message Dispatcher to be logged to the system database and displayed through message windows within the Operator Services component. Preferably, the Macro process sends a message to the Message Dispatcher each time a macro is scheduled or executed. The Macro process also sends a message to the Message Dispatcher for each event that the user initiates.

The Macro process requests all the known software versions from the PDS Server. This information is presented to the user when the user chooses to assign a macro step for an IRD software download command and wishes to chose the software version or the command by picking from a list.

The Macro process communicates with the Macro Server to receive, maintain (save, edit and delete), schedule and execute macros. A macro schedule or window receives the status of pending, executing and completed macros through communication with the Macro Server.

Another subprocess within the Site Control process is the Satellite Circuit Plan process ("SCP process"). The SCP process provides a user interface to manage a network SCP (e.g., a broadcast schedule). Preferably, this is accomplished on a monthly basis. The SCP process provides the ability to create a new SCP by loading a schedule from a floppy disk, manually building a new SCP, or updating/deleting an existing SCP. The SCP process is comprised of three major subprocesses. The first major subprocess is the Load SCP subprocess. This subprocess allows a broadcast schedule to be loaded from a floppy disk for the network. It can load a broadcast schedule for any network for as long as the input file follows a specific format. The second major subprocess is the Build New SCP subprocess. This subprocess provides the ability to manually create a broadcast schedule for any network. The third major subprocess is the View/Update SCP subprocess. This subprocess allows an operator to review or modify existing broadcast schedules for any network.

Preferably, a network customer will provide a broadcast schedule to the operator of the management system each month. The broadcast schedule can be included on a floppy disk. The schedule should indicate the broadcast channel, schedule, start and end times., and the satellite circuits that should receive the broadcast. Preferably, the management system operator transmits the schedule to the destination devices within the designated satellite circuits by way of the PDS Manager and PDS Server. Preferably, the schedule field on the input file is represented in terms of days of the week as opposed to actual calendar dates. Before a schedule can be used by the PDS Manager and transmitted by the PDS Server, it should be translated into actual calendar dates and stored on the database.

Broadcast files can generally be edited and converted into calendar dates in one of at least two ways. For example, the conversion may be by "generated input." According to this method, the input schedule as it appears on the floppy disk is displayed to the operator for review. After all changes are made to the schedule, it is sent to the SCP Server where it is converted into calendar dates. This option reduces the amount of information that the operator needs to review, reduces the amount of network traffic, and places the load on the SCP Server to create SCP output records. Conversion may also be accomplished by "generated output." According to this method, the input schedule is translated into calendar dates and displayed to the operator for review. After all changes are made to the schedule, it is sent to the SCP Server where it is stored on the database. This option provides the ability to review the converted SCP outputs but greatly increases the amount of information that must be reviewed by the operator and the amount of network traffic. Preferably, the operator specifies the time period that the SCP will span. By specifying a date and time for start and a date and time for end, SCP output records will be generated for each specified week day during the specified time period.

Preferably, each input record is validated before SCP output records are generated. As part of the validation process, a specified channel must be defined for the specified network. Also, the schedule should equal "MWF" (Monday, Wednesday, Friday) or "TTSS" (Tuesday, Thursday, Saturday, Sunday). Start times and end times should be, in the form of valid military times. Also, satellite circuits specified on the input record must be those defined to the network.

When processing a floppy disk SCP received from a network customer, the management system operator will have several options to deal with satellite circuits which art not defined to the network. Among these options, the management system operator can ignore the undefined satellite circuit, add a satellite circuit to the network, or replace each occurrence of the undefined satellite circuit with another already defined satellite circuit on the network. According to another feature, if an overlapping schedule entry already exists on an SCP, the operator will have the option to ignore the duplicate entries or delete the overlapping entries.

The satellite circuits specified for each input record are used to calculate the PDS PTM. The PDS PTM is transmitted as part of the PDS command by the PDS Server. The PDS command contains encryption and decryption information used by IRDs within the designated satellite circuits to determine if they are authorized to receive the broadcast being transmitted. The PDS PTM is calculated by adding the ADS PTMs (by key index) for each satellite circuit on the input record. For example, if a schedule entry indicates that satellite circuits AAA and BBB are authorized to receive a specific broadcast on channel 1 at 9:00 each MWF, this process will calculate the PDS PTM as follows: First, the process will obtain a key index associated with channel 1. Second, the process will find the ADS PTM for that key index for satellite circuits AAA and BBB within the satellite circuit ADS class. Third, these two values will be added to obtain the PDS PTM. The PDS PTM is calculated for each input or output displayed to the user based on the network defaults and the ADS PTM values at the time the window is displayed.

When creating a new SCP through the Load or Build subprocesses, the operator has the option of creating a set of special scheduled entries. This set of scheduled entries is referred to as the SCP defaults. The management system may be configured such that the default entries are automatically generated when a new plan is created. This feature reduces the amount of repetitive data entry required by an operator when creating a new plan.

After an operator has reviewed and modified an SCP, the SCP can be saved to the database. As each generated output record is saved to the database, any duplicate schedule entries will be deleted from other SCPs within the network. The subprocess which permits the building of new SCPs provides the ability to manually create an SCP for any satellite circuit defined to the network. An operator can create, update and delete schedule entries in the SCP output format. The main difference between this subprocess and the process which allows loading of SCPs is that in the Build New SCP subprocess, output records are not automatically generated from SCP input records. Rather, they must be created one at a time. However, as with the Load SCP subprocess, SCP defaults may be generated. According to the View/Update SCP subprocess, an operator can view, update or delete an existing SCP. Under this subprocess, the operator can view a list of all SCPs defined to the network. From the list, the operator may select an SCP and view or update the SCP. Thus the operator can create, update and delete schedule entries in the SCP output format. When all updates have been complete and the operator saves the plan to the database, only the updated records should be sent to the SCP Server and updated on the database.

Figure 9:
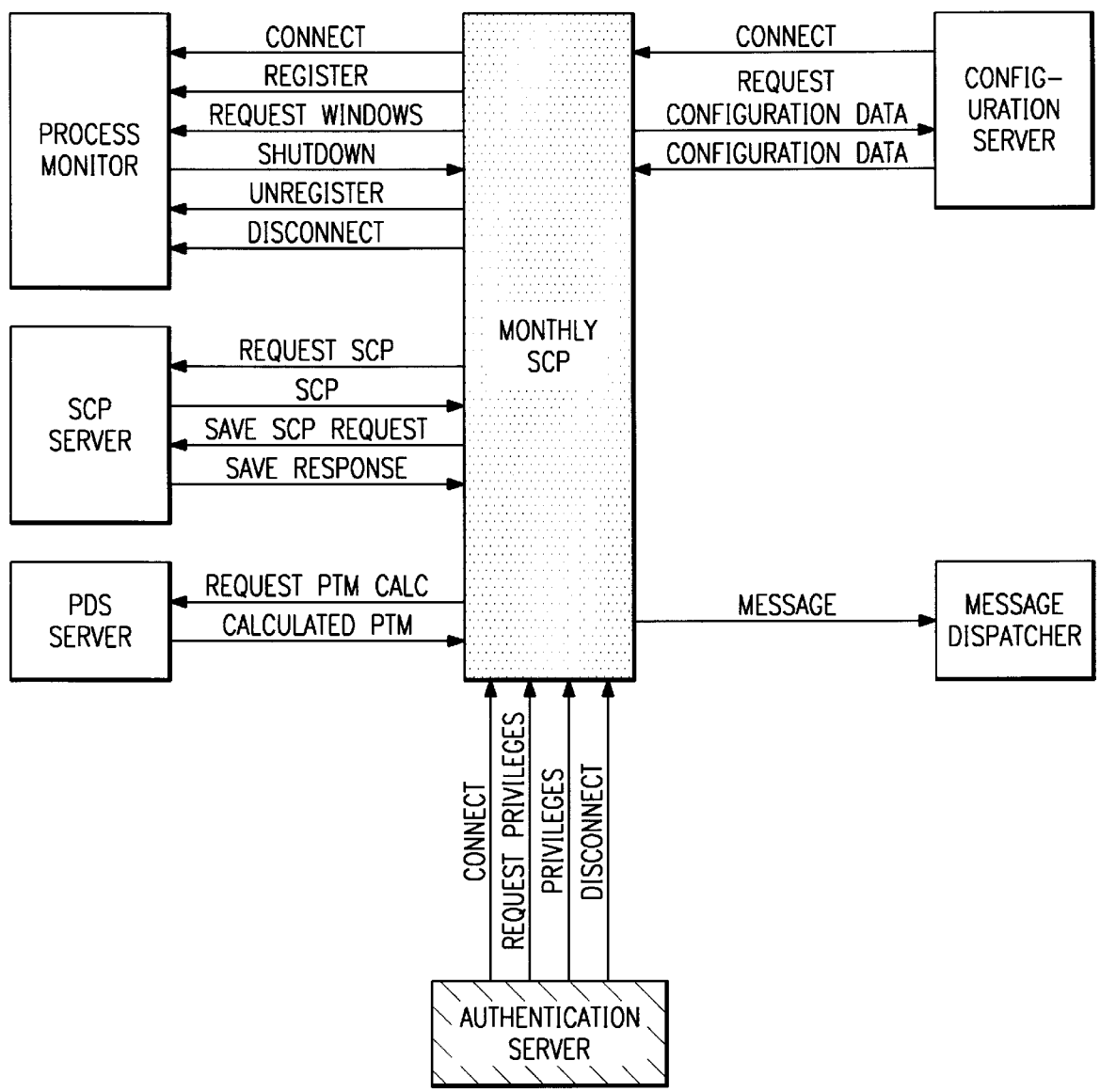
FIG. 9 is a block diagram representing the interfacing between a process of the management system of FIG. 2 and the remainder of the management system of FIG. 2.

The interfacing of the SCP process with the remainder of the management system is shown in greater detail in FIG. 9. The Top Level Menu Process is responsible for initiating the SCP process after a user has successfully logged on. The SCP process registers itself and its associated windows with the Process Monitor. The SCP process also connects to the Authentication Server process to obtain a list of user-specific privileges. The SCP process request configuration information from the Configuration Server such as network defaults and satellite circuits. The SCP process is also connected as a client process to the Message Dispatcher process. The SCP sends messages to the Message Dispatcher to be logged to the database and displayed through message windows within the Operator Services component. The SCP process also obtains calculated PDS PTM values and other information necessary for creating an SCP through its connection to the PDS Server. The SCP process communicates with the SCP Server to save new SCPs to the database. Updates or deletions of existing SCPs are also performed through this connection.

The last subprocess within the Site Control process is the PDS Manager process. This process uses data from the SCP to create the program data stream and transmit it to the IRDs. The PDS is transmitted by date, time and channel to the IRDs through the encoders. The SCP contains a list of valid satellite circuits for a particular date, time and channel. The PDS Manager process reads the SCP and creates the PDS for each channel, date and time based on default information defined for a network-specific channel (e.g., key index). The PDS Manager provides the ability to start, pause and stop the PDS transmission. It also provides the ability to override default information. Information such as key index, SAM and PKey can be modified for a particular channel. Because the PDS Manager process is a subprocess of the Site Control process, the interfacing of the PDS Manager with the remainder of the management system can be understood from FIG. 10. Also, the PDS Manager process is described in connection with other management system processes below.

Another major process of the Operator Services component of the management system is the Process Manager process. This process provides a user interface for starting, stopping and monitoring the status of all management system processes. This process is preferably configured to operate from any management system node so long as a graphic user interface is available at that node. The Process Manager obtains and displays information contained in the Process Monitor.

Preferably, the Process Manager displays information about each node in the management system, the processes running at each node, and general characteristics about each such process. It also provides information about the processes, the services which they provide and the connections between them.

Figure 11:
FIG. 11 is a block diagram representing the interfacing between a process of the management system of FIG. 2 and the remainder of the management system of FIG. 2.

The interfacing between the Process Manager and the remainder of the management system is shown in greater detail in FIG. 11. The Process Manager is preferably a user interface which connects to a ROOT Process Monitor to receive process status information. Typically, this information should only be available to an administrator who can send requests to the Process Monitor via the Process Manager to start, stop or update individual processes or shut down the entire management system.

III. Management Services

The second major component of the management system is the Management Services component. This component acts as the interim step between the user interfaces within the Operator Services component and the device and external system interfaces within the External Interfaces component. The Management Services component includes, for example, the Message Dispatcher process, Configuration Server process, Macro Server process, PDS Generator process, SCP Server process, Command Dispatcher process, Process Monitor process, and Authentication Server process.

The Message Dispatcher, as described above, receives informational messages from the other processes in the management system. These messages are routed to the various users who are logged onto the system. The Message Dispatcher also logs the messages to the system database for storage. Messages are also received from the management system itself and from the Process Monitor. Thus, the Message Dispatcher servers as a central repository for informational and system messages.

Figure 12:
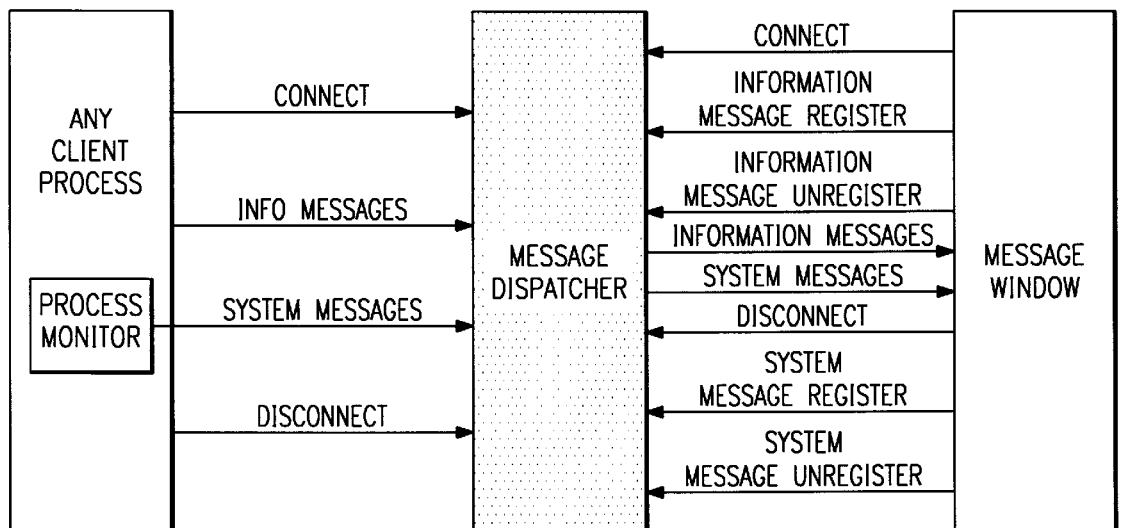
FIG. 12 is a block diagram representing the interfacing between a process of the management system of FIG. 2 and the remainder of the management system of FIG. 2.

The interfacing between the Message Dispatcher and the remainder of the management system is shown in greater detail in FIG. 12. The Process Monitor is responsible for initiating the Message Dispatcher, monitoring its status and shutting it down upon request. This interface supports these operations using a system-wide class from which the Message Dispatcher inherits. The Process Monitor also sends system messages to the Message Dispatcher. Preferably, the Message Dispatcher acts as a server to any other process in the management system which needs to create or receive informational or system messages. Messages are requested by other process via a remote procedure call ("RPC"). This call is preferably asynchronous, so that clients do not have to wait for the call to be completed before they continue processing. Each message inserted into the object model is automatically assigned a time stamp and is written into the system database.

Another major process of the Management Services component is the Configuration Server process. The Configuration Server functions as the repository of network data describing all managed objects, including all processes and devices. Network data reflects the current state of the entire network. The Configuration Server gathers data from other processes. It then adds, updates and deletes network data on persistent storage (the management system database). Information is then distributed to any process requesting it on an as-needed basis.

The types of information maintained on the Configuration Server can be divided into three classes including network inventory, network state, and application reference data. Network inventory is largely static data relating to, for example, site and network devices, countries, regions, networks, encoders, channels, satellite circuits and IRDs. Network state is dynamic data which includes current network and device status information. Application reference data includes satellite circuit plans, IRD measurements, and command execution schedules.

Preferably, there are at least two basic ways in which the Configuration Server receives and distributes data. The first way is a passive method as the remote process updates or receives data from the Configuration Server. The second way is via an remote process call function. In this latter case, the remote process must invoke the RPC to request the Configuration Server to update or distribute data. For example, the Site Management process may use an RPC function to update the "site problem status" of the Configuration Server, while the Site Management process uses another RPC to ask for IRD data.

Figure 13:
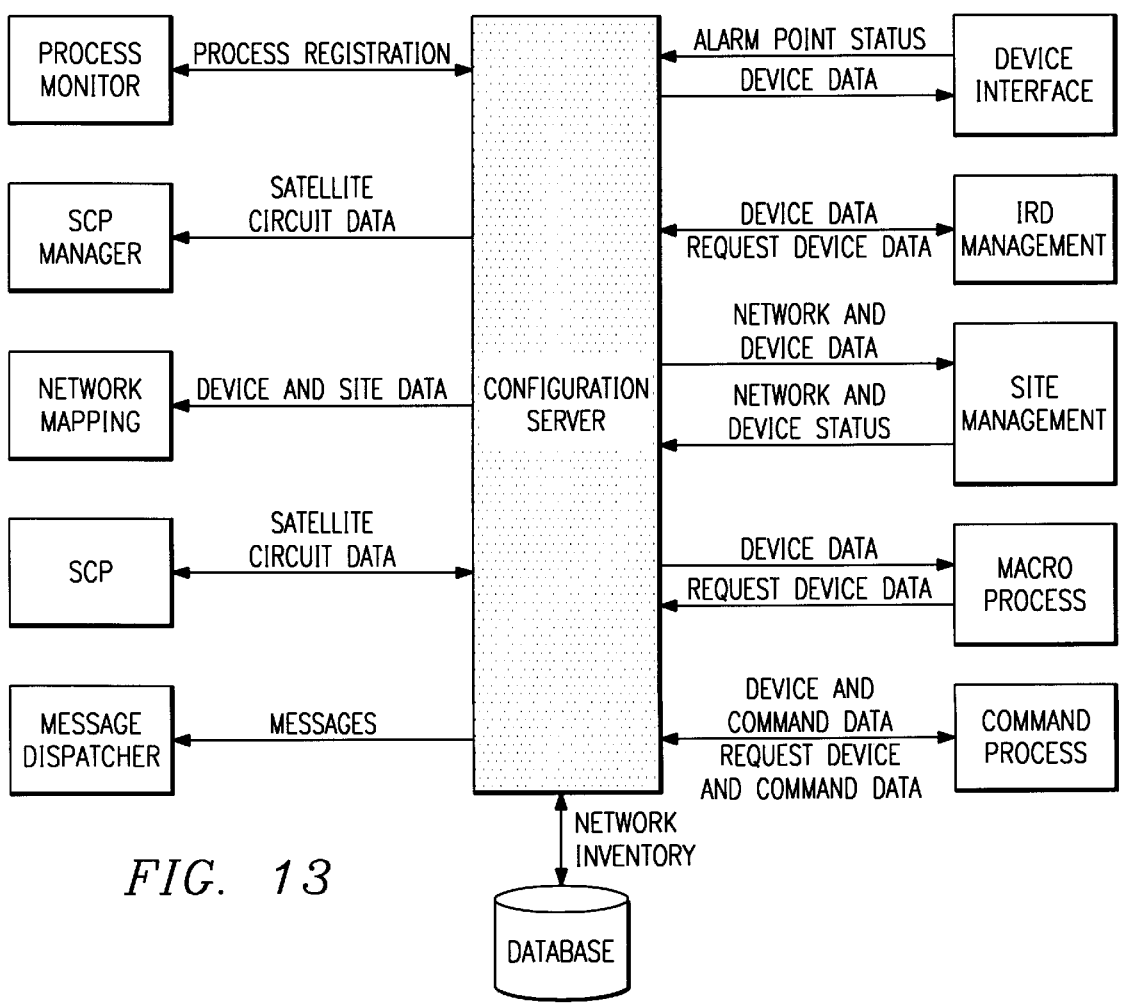
FIG. 13 is a block diagram representing the interfacing between a process of the management system of FIG. 2 and the remainder of the management system of FIG. 2.

The interfacing of the Configuration Server with the remainder of the management system is shown in greater detail in FIG. 13. The Configuration Server registers itself with the Process Manager, thus allowing other processes to communicate with the Configuration Server. When the Process Manager starts the Configuration Server, the Configuration Server initializes its in-memory database with data from the system database. When the Process Manager shuts down the Configuration Server, an RPC function can be used to request the Configuration Server to write changed network inventory data to the system database. The Configuration Server provides the network configuration data to the Network Mapping process, the Message Dispatcher process, the SCP Manager, the SCP process, the Site Control Process, the Device Interfaces, the Command process, the Macro process, the IRD management process and all other applicable processes within the management system.

Another major process within the Management Services component of the management system is the Macro Server. This process is responsible for storing and maintaining macros, scheduling macros for execution, sending the commands contained in each micro step to the Command Dispatcher for execution, and monitoring execution of all macros. The Macro Server serves as the distributor for all macro data which is contained in the system database and as the manager of all macro scheduling and execution. A user process can make a request to the Macro Server to get all the macros for a particular network. User processes can also make requests (e.g., copy, replace, save, delete, schedule and execute) to be performed on the macros and their individual steps.

Preferably, macros that are scheduled for execution are queued and await their respective execution times. Scheduled macros are maintained in memory and also written to the database as a backup. If the Macro Server is stopped for any reason, it should load all scheduled macros back into the queue from the database when it restarts. When the time comes for execution of a macro, each step is sent in turn to the Command Dispatcher. A previous step must execute before a subsequent step is sent for execution. The Macro Server is preferably capable of pausing, releasing from a previous pause or canceling a macro before execution or during the macro's execution, when requested by a user. The Command Dispatcher routes the commands and returns the results to the Macro Server. Appropriate informational messages are preferably generated and sent to the Message Dispatcher.

Figure 14:
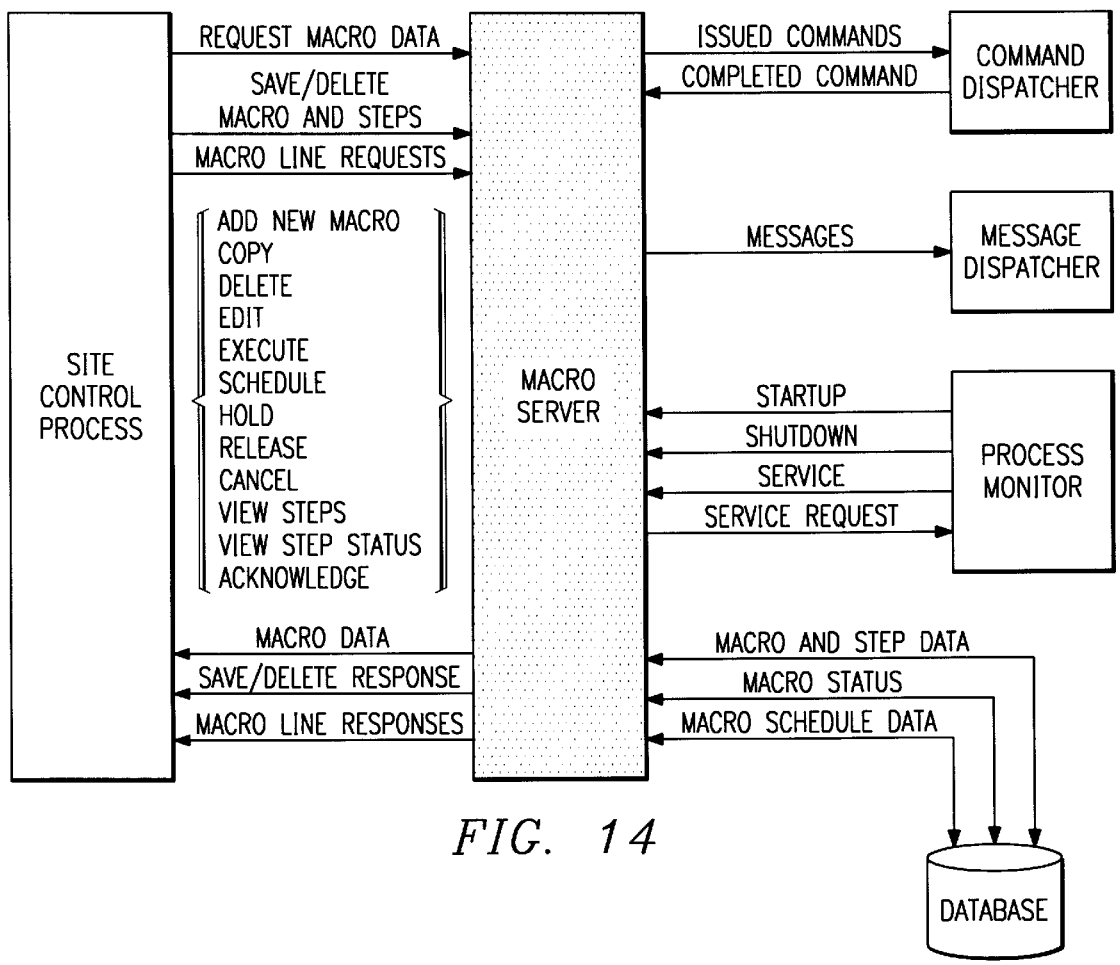
FIG. 14 is a block diagram representing the interfacing between a process of the management system of FIG. 2 and the remainder of the management system of FIG. 2.

The interfacing of the Macro Server with the remainder of the system is shown in greater detail in FIG. 14. The Macro Server interfaces with the Process Monitor which starts the Macro Server, creates service connections between the Macro Server and other compatible processes, and shuts down the Macro Server when requested. The Macro Server interfaces with the Top Level Menu process by allowing a user to access (within a window environment) all existing macro names for a specific network from the Macro Server. The Macro Server receives macro line requests from a user through appropriate windows. These requests include retrieve, save, add, edit, copy, delete, execute and schedule. The Macro Server interfaces with the Command Dispatcher by sending all macro command steps thereto. Completed commands marked with a success or failure indicator are returned back to the Macro Server from the Command Dispatcher. Appropriate informational messages are forwarded from the Macro Server to the Message Dispatcher. The Macro Server interfaces with the Configuration Server by gathering startup device data such as networks, encoders, IRDs and channels. The Macro Server interfaces with the system database by gathering from the system database all scheduled and completed macro data during startup. Scheduled and completed macros and their current status are saved to the system database when the Macro Server is shut down.

Another major process within the Management Services component of the management system is the Program Data Stream Generator ("PDS Generator"). The PDS Generator is responsible for scheduling and releasing the PDS, sending the PDS by channel to the Command Dispatcher for execution, and monitoring the execution of the PDS. The PDS Generator thus serves as the central repository for all schedule (e.g., monthly SCP) data as well as channel and key index default data. This information is loaded from the system database when the PDS Generator process is started. This information is used by the PDS Generator to create the PDS. The PDS Generator also maintains information for scheduling changes to default data used to create the PDS. An issued PDS command request may be sent to the Command Dispatcher for each network channel. The PDS command requests are continually sent to the Command Dispatcher based upon a predetermined interval. A completed command marked with a success or failure indicator is received from the Command Dispatcher for each issued command. Appropriate informational messages are generated based on PDS status and/or error conditions. The PDS Generator communicates with the PDS Manager to display information pertinent to the PDS currently being transmitted. Update requests are received from the PDS Manager to update default configuration data or to schedule updates to the default configuration data.

Figure 15:
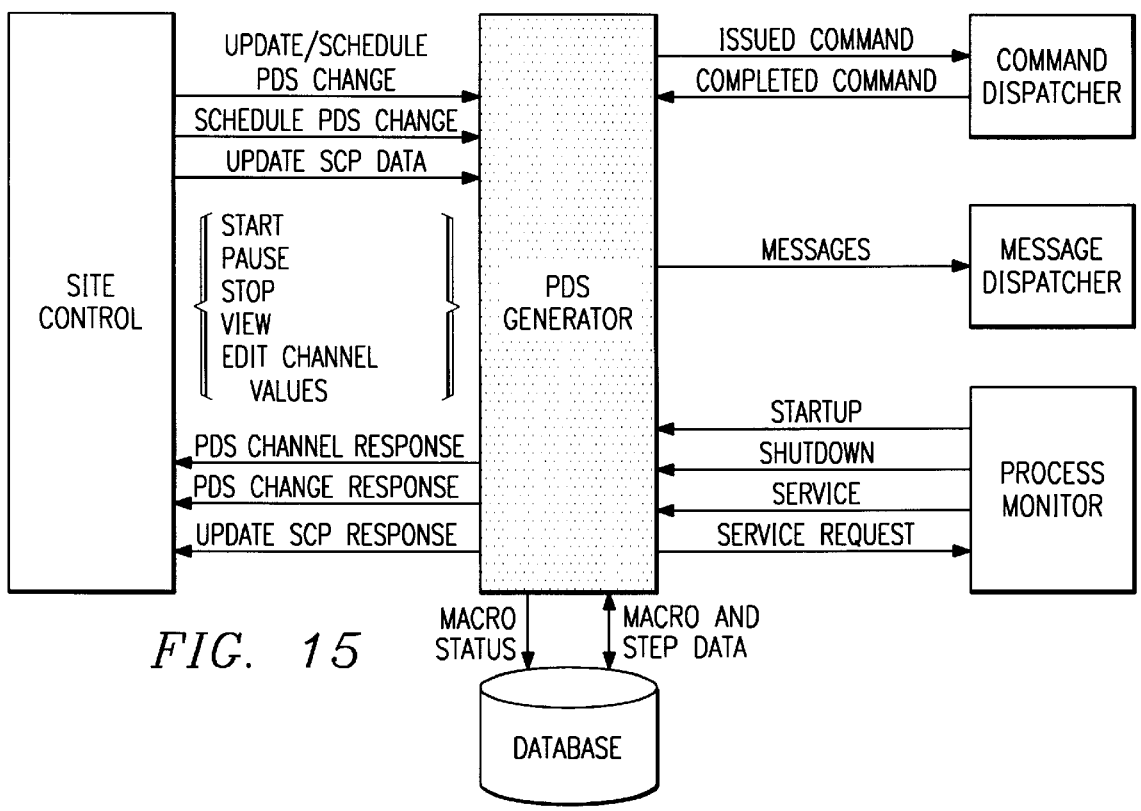
FIG. 15 is a block diagram representing the interfacing between a process of the management system of FIG. 2 and the remainder of the management system of FIG. 2.

The interfacing of the PDS Generator with the remainder of the management system is shown in greater detail in FIG. 15. The PDS Generator interfaces with the Process Monitor which starts the PDS Generator, creates connections between the PDS Generator and other applicable processes, and shuts down the PDS Generator when requested. An interface also exists with the Command Dispatcher which receives all PDS command requests from the PDS Generator. Appropriate informational messages are sent to tie Message Dispatcher. An interface also exists with the Site Control process which obtains startup information such as SCPs and default PDS data. The PDS Generator receives PDS line requests from the Site Control process including start, stop, pause, view and edit channel defaults. The PDS Generator receives requests to update or schedule updates to the PDS data from the Site Control process. An interface also exists with the system database from which the PDS Generator obtains PDS startup data. PDS status and PDS and SCP data are logged to the system database from the PDS Generator.

Another major process of the Management Services component of the management system is the SCP Server process. The SCP Server has at least two main purposes. First, this process handles all database interactions dealing with the SCP. Second, this process signals the PDS Server to update its linked lists based on the changes made to the system database. With respect to database interactions, the SCP is preferably stored on the system database in three tables including the Control table, the Output table, and the Circuit table. The Control table preferably contains high-level SCP information such as control ID, label, start and end times, and network name. The Output table preferably contains scheduled outputs including SCP control ID, exact time of the broadcast, and group ID of the satellite circuits that the SCP will be broadcast on. The Circuit table preferably contains the satellite circuit group ID and all the satellite circuits which belong in that particular group. SCP information may be saved, deleted, modified and obtained by a user. Preferably, the PDS Server is triggered to modify its linked list of current PDSs going out when changes are made to the SCP. Therefore, the SCP process must be able to recognize potential changes and call the appropriate RPC functions on the PDS Server to check its internal linked lists.

Figure 16:
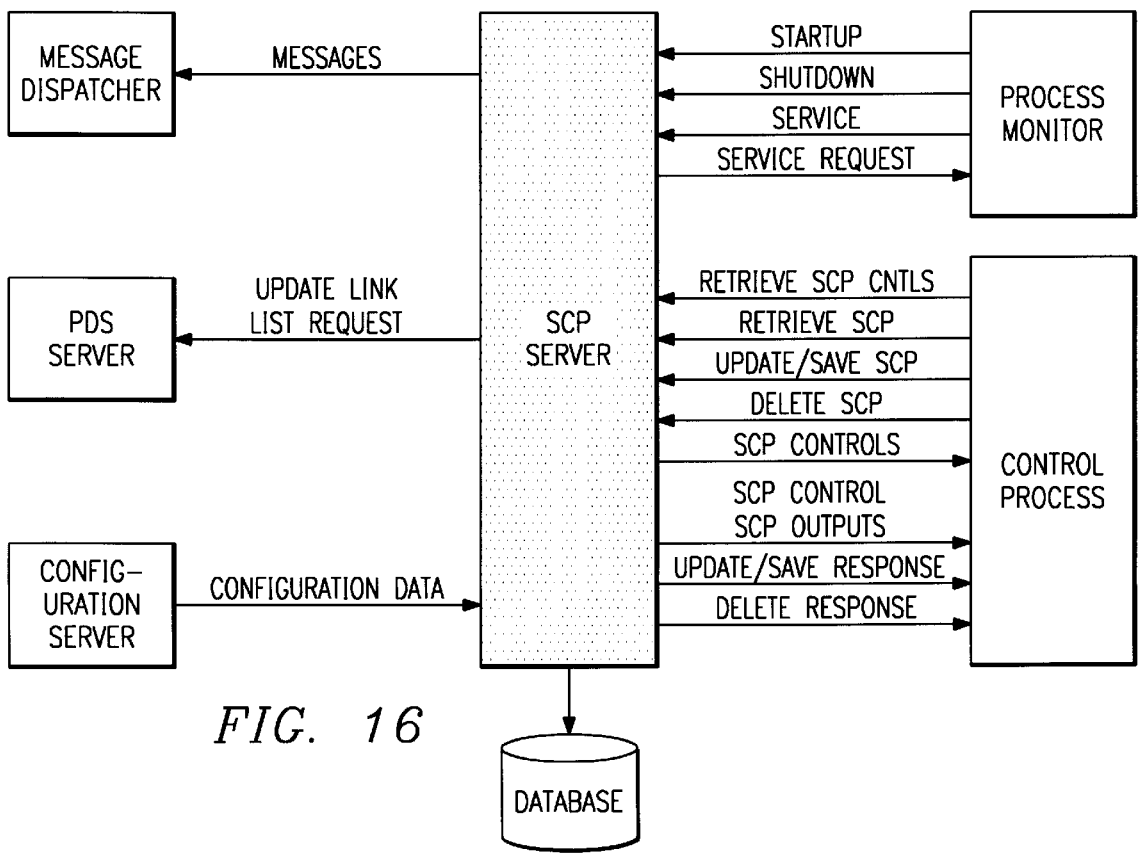
FIG. 16 is a block diagram representing the interfacing between a process of the management system of FIG. 2 and the remainder of the management system of FIG. 2.

The interfacing between the SCP Server and the remainder of the management system is shown in greater detail in FIG. 16. The Process Monitor is responsible for starting the SCP Server, monitoring its status, and shutting it down. This interface supports these operations using a system-wide class from which the SCP Server inherits. The SCP Server connects to the Message Dispatcher to send appropriate informational messages to be logged to the system database and to be displayed to users. An interface exits with the Configuration Server from which data is obtained such as networks, network defaults and satellite circuits. The SCP Server notifies the PDS Server when its linked lists must change. The SCP Server receives requests from the Control process to retrieve, update, delete or save SCPs to the system database.

Another major process within the Management Services component of the management system is the Command Dispatcher process. The Command Dispatcher is primarily responsible for issuing commands to a specific device interface for execution on the appropriate destination device and for reporting success or failure of the execution. This process also allows distribution of all command types for requesting processes and maintains freeform commands. Thus, the Command Dispatcher serves as the central dispatcher for device commands and as a repository for freeform commands.

Command types are loaded from the system database when the Command Dispatcher process is started. These command types can be received from other processes (e.g., Site Control, Macro Server, PDS Generator and Device Interface). Requests can be made to the Command Dispatcher to save, replace and delete freeform commands. As previously discussed, the Site Control, PDS Generator and Macro Server processes make requests to send commands through the Command Dispatcher to target devices for execution. A command is sent by the Command Dispatcher to a specific Device Interface depending upon the destination device. A completed command is marked with a success or failure indicator and is returned from the Device Interface to the Command Dispatcher. Completed commands and their respective indicators are then returned to the originating process with the management system.

Figure 17:
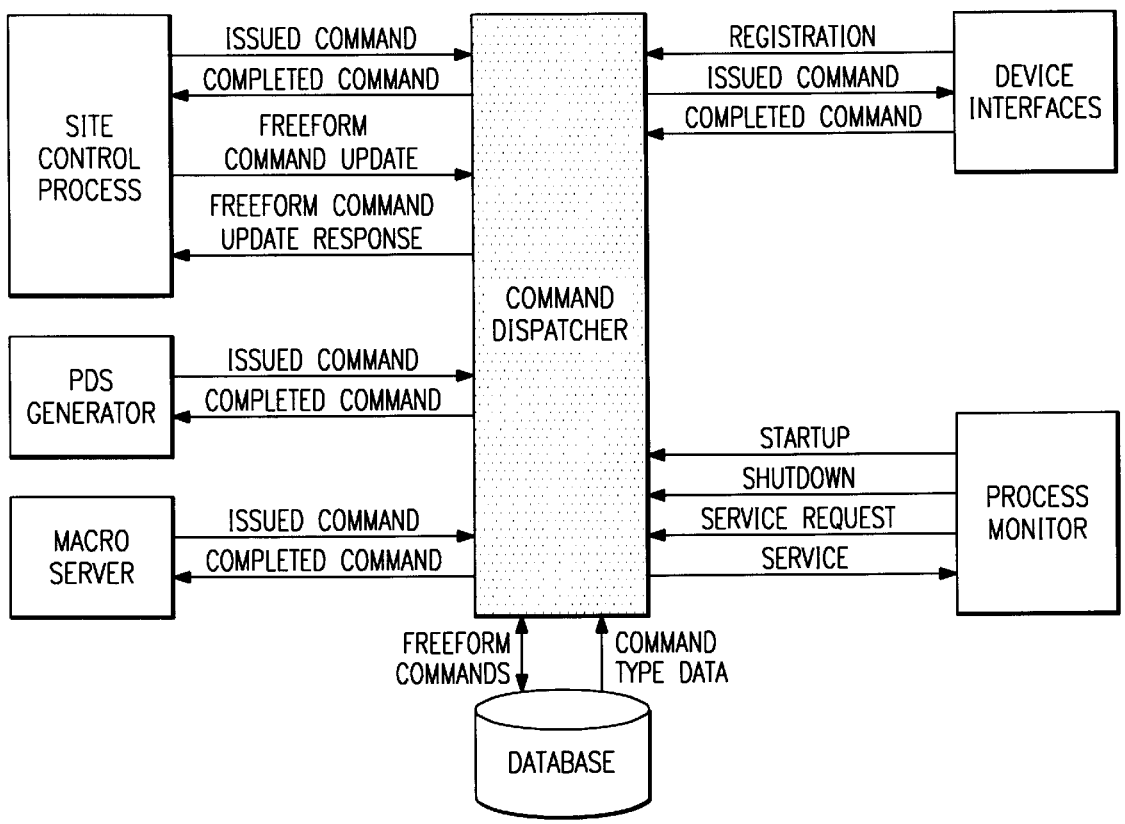
FIG. 17 is a block diagram representing the interfacing between a process of the management system of FIG. 2 and the remainder of the management system of FIG. 2.

The interfacing of the Command Dispatcher with the remainder of the management system is shown in greater detail in FIG. 17. The Command Dispatcher interfaces with the Process Monitor which starts the Command Dispatcher, creates service connections to other appropriate processes, and performs shutdown when requested. The Command Dispatcher also interfaces with the individual Device Interfaces. The Device Interfaces register each device with the Command Dispatcher to receive commands. The Device Interfaces also perform calls through the Command Dispatcher to get all the command types. Issued commands are sent to the appropriate Device Interface for execution based on the destination device. Completed commands and indicators are returned to the Command Dispatcher from the Device Interface. The Command Dispatcher also interfaces with the Site Control process, which performs startup calls to get the various command types and freeform commands. The Control process, through appropriate windows, sends command requests to the Command Dispatcher. An interface also exists with the PDS Generator, which performs startup calls to get the various command types. The Command Dispatcher receives command requests from the PDS Generator and forwards them to the appropriate Device Interface. An interface also exists with the Macro Server. This is similar to the previous interfaces.

Another major process within the Management Services component of the management system is the Process Monitor process. The Process Monitor monitors and controls all management system processes. It starts and stops all server and client processes. It can resolve requests forwarded from other processes and can terminate any system process upon request.

The Process Monitor is a server process with no visual component that simplifies the task of starting, stopping, locating and monitoring all processes within the management system. There should be one and only one Process Monitor for each node in the network. One Process Monitor is designated as the ROOT Process Monitor and all other Process Monitors connect to it to create a hierarchy of Process Monitors. The Process Monitors within this hierarchy communicate with each other to resolve requests.

Each Process Monitor is responsible for monitoring the processes running at its respective node. All known processes are collected and forwarded to the ROOT Process Monitor. This special monitor knows about all processes running within the entire network. If all application processes run on the same node in the network, only one Process Monitor (ROOT) can be active since only one Process Monitor exists on a node.

When the Process Monitor is launched, a command line parameter specifies a file containing a list of processes that it must start on the same node that the Process Monitor is running. The Process Monitor is responsible for monitoring this list of processes and uses this list to start all other management system processes in the correct order.

Each system process preferably issues a heartbeat at a specified predetermined interval. If the Process Monitor does not receive a heartbeat from a process within a specific threshold, it will assume the process is dead and prevent further communication with the process. In this case, a process can be killed and automatically restarted through the Process Monitor service. If the Process Monitor dies, all other processes on the node become inactive and the Process Monitor must be restarted.

The Process Monitor also manages the graphic user interfaces. This function allows a user interface for a particular application to be distributed among several client processes. Each logged user is assigned to a session. That session contains as many processes as needed to make up a complete instance for the user interface for an application. The Process Monitor allows processes cooperating in a session to pass messages back and forth. For example, one process may request another process in the session to display a particular window. All communication between processes is controlled through the Process Monitor.

Figure 18:
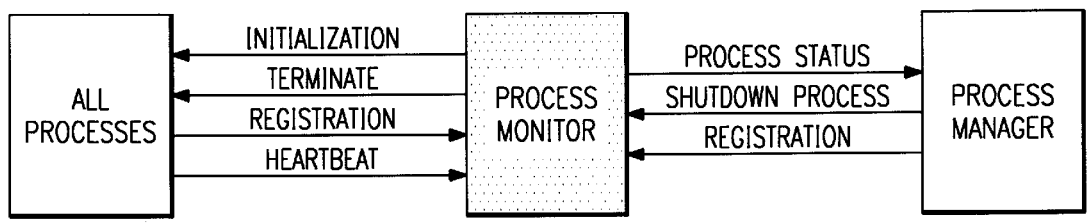
FIG. 18 is a block diagram representing the interfacing between a process of the management system of FIG. 2 and the remainder of the management system of FIG. 2.

The interfacing of the Process Monitor with the remainder of the management system is shown in greater detail in FIG. 18. The Process Monitor is a user interface process that connects to the ROOT Process Monitor to receive process status information so that this information can be displayed to a system administrator. The administrator can send requests to the Process Monitor to shut down the entire management system or to terminate individual processes. Each process within the system interfaces with the Process Monitor and indicates to this process whether it is alive and well.

Another major process within the Managment Services component of the managment system is the Authentication Server process. This process verifies user IDs and password information, controls access to various windows between related user interface processes, and controls updates to the database for authentication information. This process also has no visual component.

When the Authentication Server process is started by the Process Manager, the Authentication Server connects with the system database. The Authentication Server maintains a list of valid users and associated encrypted passwords. It verifies user ID and password information by performing a one-way encryption on the received password and then comparing the user ID and encrypted password to the list of valid users. The Authentication Server also maintains a list of operator roles, which consists of a predetermined named set of privileges. Each user ID is associated with a role.

Figure 19:
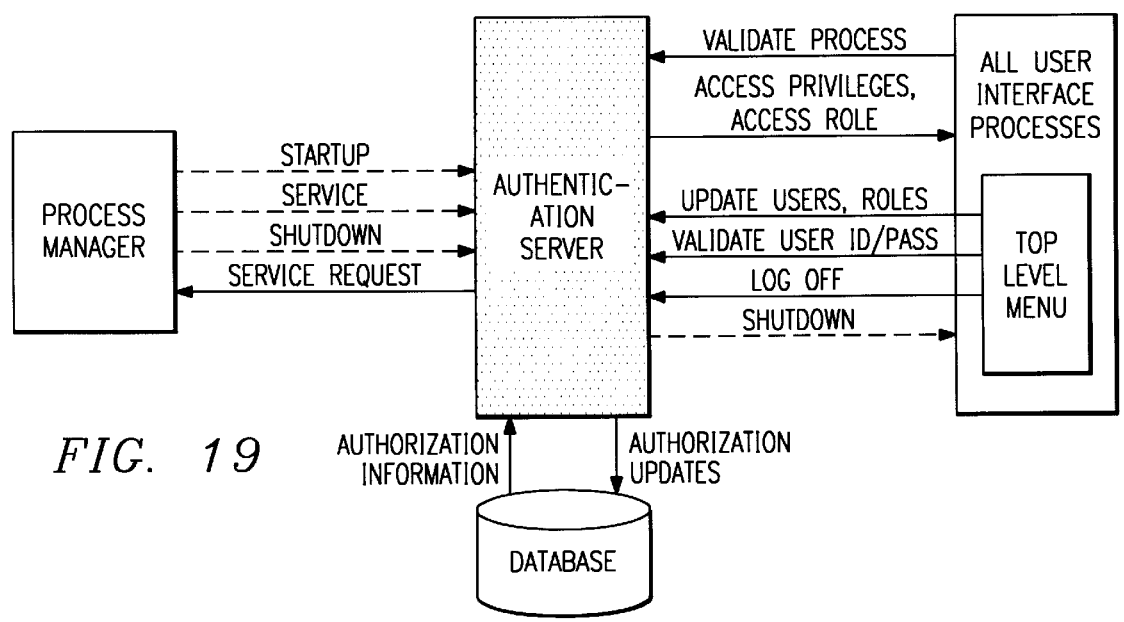
FIG. 19 is a block diagram representing the interfacing between a process of the management system of FIG. 2 and the remainder of the management system of FIG. 2.

The interfacing between the Authentication Server and the remainder of the management system is shown in greater detail in FIG. 19. The Authentication Server serves the Top Level Menu process to verify user ID, password and role information and to handle requests from an adminstrator to process inquiries and updates to the authentication information. The Authentication Server is started and stopped by the Process Manager.

IV. External Interfaces

The External Interfaces component of the management system is the third major component and includes all device interfaces and interfaces with any external systems. Preferably, interfacing with any network device is accomplished through an initial connection with one or more encoders. However, the system may be configured to incorporate direct interfacing with devices other than encoders.

For example, an interface can be provided with an encoder associated with a particular broadcast. As discussed above, commands to destination devices within one or more satellite networks may be sent via the Command Dispatcher through this interface and forwarded to the appropriate devices. These devices are preferably identified by various criteria residing on the system database and/or on one or more of the servers within the Management Services component.

This invention has been described in detail in connection with the preferred embodiments. However, these embodiments are provided by way of example only. It will be understood by those having ordinary skill in the pertinent art that modifications and changes to the systems so described may be made without departing from the scope and spirit of the invention as defined by the appended claims. For example, more than one management system may be provided within a telecommunication network. The multiple management systems may be interfaced to provide increased capacity, reliability and scalability. Also, the various components and process described above may be duplicated and integrated within a management system to provide similar advantages.

I claim:

1. A telecommunication system, comprising:
   a broadcast site having a transmitter for transmitting a program signal;
   an encoder operable to encode the program signal;
   a plurality of satellite circuits;
   a plurality of integrated receiver/decoders for receiving the program signal, each integrated receiver/decoder assigned to one of the plurality of satellite circuits; and
   a satellite for relaying the program signal from the broadcast site to each of the integrated receiver/decoders;
   and wherein the encoder is further operable to receive a program command, the program command operable to cause a change in a configuration of a selected satellite circuit independently of a configuration of other satellite circuits and a corresponding change in a configuration ofthe integrated receiver/decoder assigned to the selected satellite circuit.

2. The telecommunication system of claim 1, wherein at least two intergrated reciver/decoders are assigned to the selected satellite circuit, the program command is operable to cause a change in the configuration of the selected satellite circuit, which causes a corresponding change in a configuration of each of the integrated receiver/decoders assigned to the selected satellite circuit independently of a configuration of the other integrated receiver/decoders.

3. The telecommunication system of claim 1 wherein the program command comprises a macro, the macro comprising a plurality of commands, each of the plurality of commands changing a corresponding characteristic of the selected satellite circuit.

4. The telecommunication system of claim 1, wherein the encoder is further operable to encrypt a portion of the program signal, and wherein each integrated receiver/decoder is operable to decrypt the encrypted portion of the program signal.

5. The telecommunication system of claim 1, wherein the program command is delivered to the selected satellite circuit through an interface with the encoder.

6. The telecommunication system of claim 5, further comprising at least one other encoder, wherein the system is adapted to reroute the program command through the at least one other encoder.

7. The telecommunication system of claim 1, further comprising a management system operable to transmit the program command to the encoder, wherein the management system is adapted so that the program command is issued by an operator of the management system at a first time and is scheduled for execution on the selected satellite circuit at a second time, wherein the interval between the first and second time is predetermined.

8. The telecommunication system of claim 1, each integrated receiver/decoder having a plurality of slots, wherein the program command causes a set of decryption keys to be loaded into one of the plurality of slots.

9. The telecommunication system of claim 1, wherein an execution of the program command is automatically performed according to a predetermined schedule.

10. The telecommunication system of claim 1, wherein a plurality of program signals are transmitted to each of the plurality of satellite circuits, and wherein the encoder is operable to encode each of the plurality of program signals.

11. A telecommunication system, comprising:
a broadcast site having a transmitter for transmitting a program signal and an encoder for encoding the transmitted program signal;
a plurality of satellite circuits;
a plurality of integrated receiver/decoders, wherein each of the receiver/decoders is assigned to one of the plurality of satellite circuits;
a satellite for relaying the program signal from the broadcast site to each of the plurality of satellite circuits; and
a management system operable to change a configuration of a selected satellite circuit independently of a configuration of other satellite circuits and a corresponding change in a configuration of the receiver/decoder assigned to the selected satellite circuit by transmitting a program command to the encoder.

12. The telecommunication system of claim 11, wherein the management system comprises an operator services component; a management services component and an external interface component,
wherein the operator services component provides an interface between the management system and a plurality of operators,
wherein the management services component includes a plurality of servers to communicate with the operator services component and the external interface component, and
wherein the external interface component provides an interface between the management services component and a plurality of external devices.

13. The telecommunication system of claim 11 wherein one of the plurality of external devices comprises the encoder.

14. The telecommunication system of claim 11 wherein the plurality of external devices comprises the plurality of integrated receiver/decoders.

15. A method for managing a telecommunication system, comprising:
transmitting a program signal from a broadcast site to a satellite;
relaying the program signal from the satellite to each of a plurality of integrated receiver/decoders, each integrated receiver/decoder assigned to one of a plurality of satellite circuits; and
transmitting a program command to an encoder coupled to the broadcast site, the program command operable to change a configuration of a selected satellite circuit independently of a configuration of other satellite circuits and a corresponding change to a configuration of the receiver/decoder assigned to the selected satellite circuit.

16. The method of claim 15, wherein at least two intergrated reciever/decoders are assigned to the selected satellite circuit, wherein transmitting the program command is further operable to change a configuration of all the receiver/decoders assigned to the selected satellite circuit.

17. The method of claim 15, further comprising:
encrypting a portion of the program signal using the encoder prior to transmitting the program signal to the satellite; and
decrypting the encrypted portion of the program signal using the receiver/decoders.

18. The method of claim 15, wherein transmitting the program command is further operable to load a set of decryption keys into one of a plurality of slots of the receiver/decoder assigned to the selected satellite circuit.

19. The method of claim 15, wherein transmitting the program command is further operable to assign another receiver/decoder to the selected satellite circuit.

20. The method of claim 19, wherein transmitting the program command is further operable to delete one of the receiver/decoders assigned to the selected satellite circuit from the selected satellite circuit.

* * * * *